United States Patent [19]
Merrill et al.

[11] Patent Number: 5,954,510
[45] Date of Patent: Sep. 21, 1999

[54] INTERACTIVE GOAL-ACHIEVEMENT SYSTEM AND METHOD

[76] Inventors: David W. Merrill, deceased, late of Friendship, Me.; by Mary Edge Merrill, executrix, P.O. Box 69, Friendship, Me. 04547

[21] Appl. No.: 08/753,951

[22] Filed: Dec. 3, 1996

[51] Int. Cl.[6] .......................... G09B 19/00; G09B 19/18; A63B 69/00

[52] U.S. Cl. .......................... 434/236; 434/107; 434/219; 434/238; 434/247

[58] Field of Search .................................. 434/236, 238, 434/247, 107, 219

[56] References Cited

U.S. PATENT DOCUMENTS

| | | |
|---|---|---|
| 3,981,087 | 9/1976 | Sachs . |
| 3,999,307 | 12/1976 | Tsuda et al. . |
| 4,170,832 | 10/1979 | Zimmerman . |
| 4,611,996 | 9/1986 | Stoner . |
| 4,895,518 | 1/1990 | Arnold et al. . |
| 5,126,936 | 6/1992 | Champion et al. . |
| 5,214,579 | 5/1993 | Wolfberg et al. . |
| 5,243,517 | 9/1993 | Schmidt et al. . |
| 5,302,132 | 4/1994 | Corder . |
| 5,372,507 | 12/1994 | Goleh . |
| 5,424,945 | 6/1995 | Bell . |
| 5,551,880 | 9/1996 | Bonnstetter et al. . |
| 5,596,994 | 1/1997 | Bro .......................................... 600/545 |
| 5,597,312 | 1/1997 | Bloom et al. . |
| 5,601,432 | 2/1997 | Bergman . |
| 5,673,691 | 10/1997 | Abrams et al. .......................... 600/300 |

OTHER PUBLICATIONS

Greenhaus et al, "The Role of Goal Setting in Career Management", International Journal of Career Management, vol. 7, No. 5 pp. 3–12, 1995.

Partlow, Charles G., "Human–Resources Practices of TQM Hotels", Cornell Hotel & Restaurant Administration Quarterly, vol. 37, No. 5, pp. 67–77, Oct. 1996.

Goleman, Daniel, "Pandora's Box and Pollyanna: The Power of Positive Thinking", Emotional Intelligence, The Master Aptitude, Bantam Books, pp. 86–91.

Nadler, David A., "Feedback and Organization Development: Using Data–Based Methods", Addison–Wesley Publishing Company, pp. 57–81.

Lawler, Edward E. III, "Motivation in Work Organizations", Behavioral Science in Industry Series, Brooks/Cole Publishing Company, pp. 44–47, 52–61 and 160–161.

Mowrer, O. Hobart, Learning Theory and Behavior, John Wiley & Sons, Inc. pp. 270–275.

*Primary Examiner*—Robert A. Hafer
*Assistant Examiner*—John Edmund Rovnak
*Attorney, Agent, or Firm*—Jones, Tullar & Cooper

[57] ABSTRACT

An interactive system and method for assisting people in achieving and learning to achieve self-determined, measurable goals over time collects data from a user on the user's progress toward achieving the goals. Metrics are computed from the data which gauge the user's progress towards achieving the goals, and performance feedback is provided to the user. Additional information may be collected from the user regarding their estimate of the likelihood of achieving the goals, and a separate computation may be made of an objective estimate of the user's likelihood of achieving the goals. Random or scheduled, positive or negative psychological reinforcement may also be provided to the user. Preferably, a computer-based system is employed for implementing the method in which a computer system receives and stores all of the collected information, computes the metrics and generates the performance feedback in the form of a progress report. Any suitable input device, such as a touch-tone telephone for example, may be employed for entering the data into the computer system, while any suitable output device, such as a facsimile machine, may be employed for communicating the performance feedback to the user.

12 Claims, 18 Drawing Sheets

INTERACTIVE GOAL-ACHIEVEMENT SYSTEM AND METHOD

BACKGROUND OF THE INVENTION

1. Field of Invention

This invention relates to a goal-achievement and learning system and method, specifically to an interactive, goal-oriented system and method that improves an individual's ability to achieve measurable, self-determined goals over periods of time using interactive information exchange, feedback and reinforcement.

2. Description of the Prior Art

Human learning, especially learning to achieve specific goals, has been a rather haphazard affair usually based on human-to-human interaction. At its best, when a student has the undivided attention of a human mentor, learning occurs rapidly and with excellent results. Unfortunately most people never encounter this type of mentoring situation because it is extremely inefficient, requiring one well-trained professional mentor per person. Consequently this learning method is very costly.

Because of these limitations, many inventors have attempted to create teaching machines that can take the place of a human teacher. Early approaches used mechanical means. For example, U.S. Pat. No. 3,981,087 to Sachs (1976) discloses a system which uses cards and conveyors. The advent of film and video allowed teaching machines such as disclosed in U.S. Pat. No. 4,170,832 to Zimmerman (1979) to present audio-visual materials, but mechanical contrivances like these suffer from limited decision-making and response abilities.

The advent of electronic computers has prompted inventors to incorporate data processing systems into teaching machines. U.S. Pat. No. 3,999,307 to Tsuda (1976) and U.S. Pat. No. 4,611,996 to Stoner disclose such machines. However, these inventions are both examples of programmed learning. Such devices teach a preselected course of materials and provide limited feedback to the student. Programmed-learning systems do not teach the general skills of goal setting and achievement. The prior art seems to have completely ignored psychological knowledge about learning and motivation, particularly in learning to achieve goals.

Other inventors have exploited the computer's ability to track complex financial transaction sequences with the intent of helping users achieve improved financial results. U.S. Pat. No. 5,214,579 to Wolfberg (1993) discloses a goal-oriented investment indexing, tracking and monitoring data processing system that tracks investments and reports on portfolio growth. This system provides a user with feedback on investment decisions but it is a batch system based upon a large mainframe computer and therefore provides no interactivity. Further, Wolfberg's invention focuses on the computations of financial performance, not on the optimizations of user feedback and learner motivation, to achieve self-determined goals.

U.S. Pat. No. 5,126,936 to Champion (1992) describes a goal-directed financial asset management system for making financial trades. Champion's invention evaluates requested trades and either affirms or denies them based on computed risk factors. Champion's invention does not provide direct feedback to the user and is unconcerned with a user's motivation. Any user feedback from Champion's invention must take place through indirect means. Indirect feedback is much less effective as a learning tool than direct and timely feedback.

Psychologists and educators have long recognized the importance of setting goals for individuals and groups to achieve improved performance. Learning theories share a common thread that includes the importance of reinforcement, rewards, success and failure, and knowledge of results. It has become an accepted principle that ultimately all learning is self-directed. The eminent American psychologist Carl Rogers said in his later years, "I have come to believe that the only learning which significantly influences behavior is self-discovery, self-appropriated learning." In addition, for feedback to be motivating, the learner must perceive the goal as attainable and must value the outcome and rewards accrued through improved performance.

Since the 1960's, expectancy theory as articulated by V. H. Vroom has stated that motivation can be influenced by an individual's expectation that effort or action by the individual will lead to the desired result. More recently, Synder has shown that hope does more than provide a bit of solace. It plays a surprisingly potent role in life. Hope, in a technical sense, is more than the sunny view that everything will turn out all right. Synder defines it with more specificity as "believing you have both the will and the way to accomplish your goal, whatever they may be."

As an example, even though we are all familiar with the importance of goals, we are also all familiar with the New Year's resolution to lose weight which is often forgotten before February first. The individual's loss of motivation does not occur because the weight-loss goal was not a serious objective. There was no weight loss because there was no simple, readily available way to collect data that provided the feedback, reinforcement and rewards necessary to motivate continued improvement. Getting on the scales and weighing yourself is not enough of a psychologically rewarding task to energize and motivate improved behavior. The immediate reinforcement provided by your favorite food and beverage is a far more powerful motivator than the data you get by checking your current weight.

At the same time, research has shown that the collection, analysis and feedback of measurable data can be an extremely effective motivator. Individuals will learn and behave in ways that improve performance when they:

set realistic goals, have clear expectations that certain actions will lead to success, compete with their own results, and keep score with personally meaningful, non-punitive, reinforcing feedback.

The advent of computer games provides clear evidence of the addictive, motivating power of immediate feedback. The learning that takes place as game players try to improve their score is clear evidence of the effect immediate feedback has on learning as well.

In many situations an individual sets a measurable goal such as weight loss or sales gains and then seeks a person, support group, coach or mentor to assure success. An individual or a group working with the individual on a regular basis to maintain goal-focused activity, provide feedback and furnish reinforcement does improve results and encourage learning. This process works more or less for different people depending on the nature and quality of the feedback and the type of reinforcement supplied by the coach or group. Managers in a work setting are expected to perform this role but more often than not they have limited understanding of the psychological process of learning and feedback. Some managers do help people learn to improve performance by providing immediate feedback, reinforcement and rewards, but this is not a predictable behavior for many mangers.

Furthermore, psychological studies repeatedly show that motivation to improve performance is intrinsic to every individual and is not the result of someone else's manipulation. Studies also show that individuals often set goals but they seldom establish a systematic program that will provide the analysis of results, the feedback and the reinforcement that is essential to reach their goal.

In addition to what is known about learning, motivation and influencing behavior, it is significant to point out that the process of striving to reach an objective is not necessarily a rational activity. Expectations about personal outcomes drive behavior even when the behavior can not actually control the outcome. Witness the individual playing a casino slot machine. This is not a rational behavior, because most gambling-machine players lose, but gamblers hold expectations about a payoff and the gambling machine is designed to reinforce personal action with random rewards. The machine rewards the individual just enough to maintain this irrational, goal-focused expectation until the gambler's money runs out. Unfortunately, although gambling machines are designed to exploit the principles of expectancy, feedback and rewards, they do so to maximize the extraction of money from the individual and not to effect learning or to help the individual achieve realistic goals.

For data feedback to be motivating several conditions must exist:

- a specific task or activity must be identified, a goal must be set, and the personal actions needed to improve performance must be presented to the individual;
- the individual needs to participate in the collection of the data and believe in the accuracy and meaningfulness of the information;
- the feedback provided to the individual needs to be timely and must be seen as relating to personal actions that an individual can control; and
- the feedback should be presented in a positive and non-threatening manner with appropriate positive and negative rewards for improved or for poor performance respectively.

SUMMARY OF THE INVENTION

In view of the foregoing, it is clear that a system and method are needed whereby an individual can achieve and learn to achieve quantitatively measurable goals through appropriate data feedback. Several objects of the present invention which fulfills the need, therefore are:

- to provide an interactive system and method that helps a person achieve any quantitatively measurable goal over a period of time through timely user feedback regarding progress made to date towards selected goals;
- to provide an interactive system and method that will give a person helpful counsel and advice on how to reach selected goals based on the person's past performance;
- to provide an interactive system and method that will challenge and teach a person to achieve goals by providing psychological feedback designed to encourage rapid learning; and
- to provide an interactive system and method that will provide a person with psychological reinforcement that enhances learning through positive reinforcement in response to good choices and negative reinforcement in response to poor choices.

These and other objects are achieved by the present invention through the provision of an interactive system and method that helps individual's both achieve and learn to achieve quantifiable, measurable goals over time. In its broadest sense, the method consists of three major steps. First, goal-related data that describes activities performed by the user for the purpose of achieving the goal or goals is collected. Next, one or more metrics are computed, based on the collected goal-related data, which gauge the user's progress towards achieving the goal or goals. These metrics are then employed to generate a performance analysis which is provided as timely feedback to the user. Other steps are also preferably employed to enhance the operation of the method. These include the computation of an objective estimate of the user's likelihood of achieving the goals based on the user's prior activity and goal-related performance which may be compared to the user's own estimate of the likelihood of achieving the goals. Random or scheduled, positive or negative psychological reinforcement is also preferably provided to the user to further assist them in achieving their goals. All of the goal-related data is preferably stored so that future metrics may be computed as the user progresses towards achievement of the goal or goals.

The system employed to carry out the method of the present invention is preferably a computer based system which includes at least one input device for enabling a user to enter the necessary data, as well as at least one output device to provide the user with the performance feedback data. The computer system receives and stores all of the goal-related data, and computes the metrics gauging the user's progress towards achieving the goals, as well as the objective estimate of the user's likelihood of achieving the goals. Based upon an analysis of the data, the computer system also provides the periodic positive or negative psychological reinforcement. Although any suitable input and output devices can be employed with the system of the present invention, a conventional touch-tone telephone is particularly suited as an input device since it allows the entry of data to a remotely located computer system and eliminates the need that a user have access to a personal computer. Similarly, a conventional fax machine is particularly well suited for use as the output device since it enables the computer system to send feedback in the form of printed progress reports to remotely located users.

BRIEF DESCRIPTION OF THE DRAWINGS

The foregoing and other features, objects and advantages of the present invention will become apparent from the following detailed description of a number of preferred embodiments thereof, taken in conjunction with the accompanying drawings, in which.

DETAILED DESCRIPTION OF THE PREFERRED EMBODIMENTS

Figure 1A:
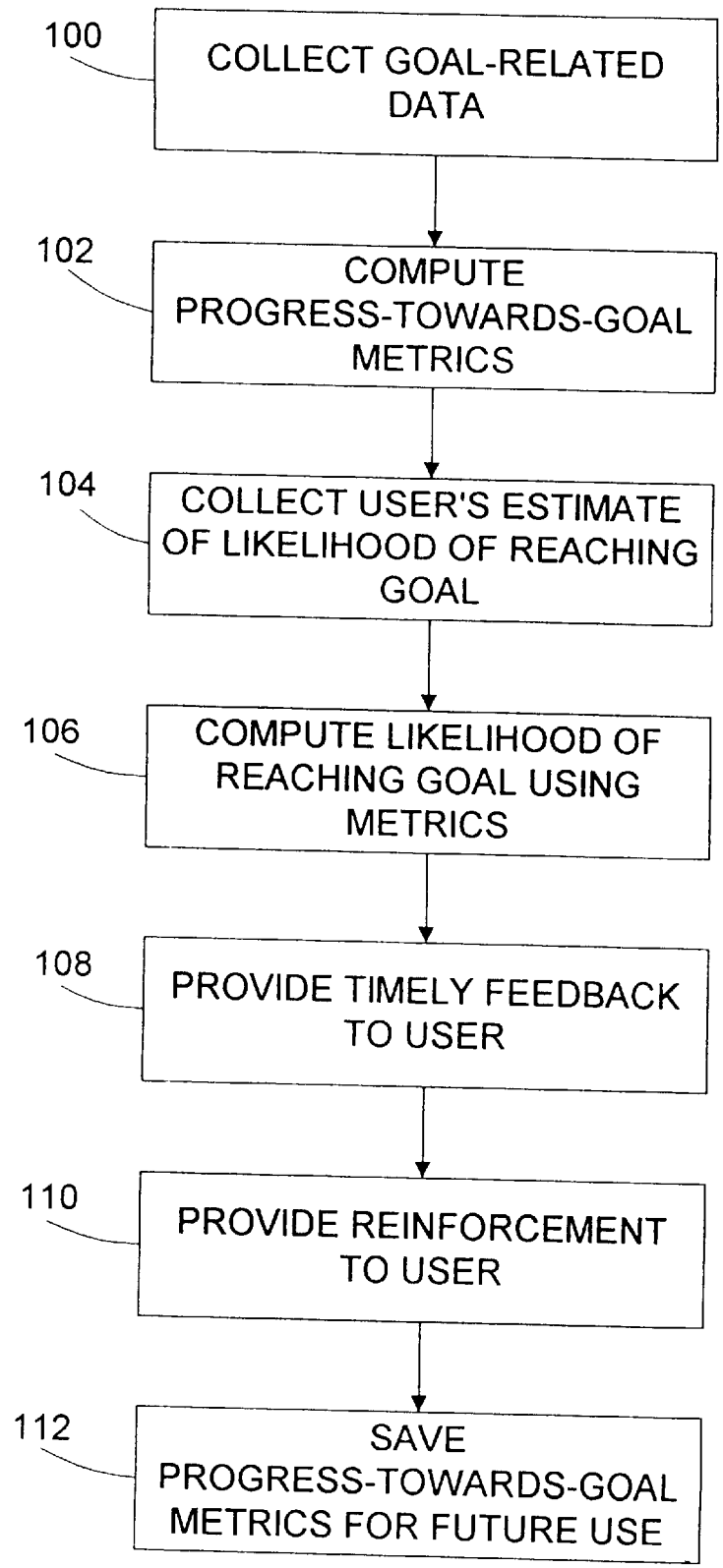
FIGS. 1A and 1B show two process sequences for the overall operation of the preferred embodiments of the interactive goal-achievement method of the present invention.
Figure 1B:
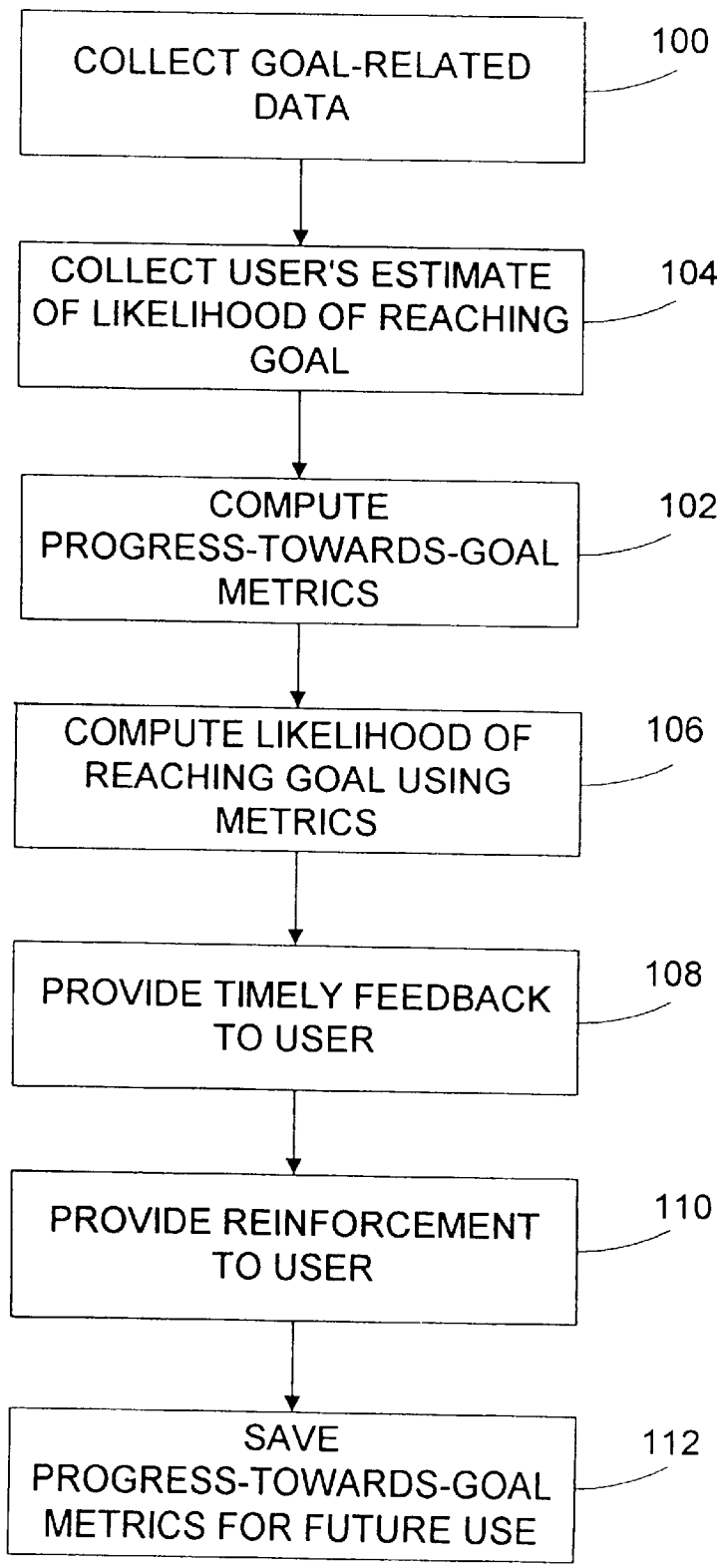

Turning now to a detailed consideration of a number of preferred embodiments of the present invention, the heart of the invention resides in its method for helping a person, herein called the user, achieve measurable goals over a period of time through the execution of a multiple step process sequence on a recurring basis. FIGS. 1A and 1B show two alternative process sequences each comprising seven process steps 100 to 112 which are preferably implemented by all embodiments of the present invention, although some of the steps may be deleted as discussed below. Said process sequences shown in FIGS. 1A and 1B comprise the same seven process steps 100 to 112, but FIGS. 1A and 1B show the seven steps in different execution order.

The process sequences shown in FIGS. 1A and 1B produce the same result but one sequence may operate more quickly or more efficiently than the other process sequence depending on the physical embodiment of the invention, the number of users a particular embodiment of the invention is designed to accommodate, and the nature of the goals and time periods associated with a particular embodiment of the invention.

The process sequences shown in FIGS. 1A and 1B both start with process step 100, the collection of goal-related data. Process step 100 asks the user several questions about current short-term, intermediate-term and long-term goals. Process step 100 collects the answer to each question before asking the next question.

In an embodiment of the present invention designed for salespeople, goals relate to sales, specifically to dollar amounts. Questions are enunciated by the present invention during process step 100 over a telephone connection. The user responds to these questions by pressing a key or keys on a telephone's push-button keypad. Questions in process step 100 ask about long-term and short-term goals including but not limited to yearly and monthly dollar goals. The user also responds to questions about dollar goals for various open accounts using the telephone keypad.

In the embodiment of the present invention designed for salespeople, process step 100 also asks the user about activities related to the achievement of the user's sales goals. Activities performed to achieve sales goals include but are not limited to acquiring new clients and making sales calls to existing clients. There are several steps in the sales process from initial meeting to sale. Part of process step 100 in the salespeople embodiment of the present invention is to ascertain the present step of the sales process for each open account.

In an alternative embodiment of the invention designed for people wishing to lose weight, the user answers questions relating to long-term and short-term weight-loss goals. The user then enters the results of regular weighings, information about calorie consumption and exercise data into the interactive goal-achievement system on a regular basis.

In yet another alternate embodiment of the invention designed for people interested in making financial investments on a regular basis, the user answers questions about long-term and short-term investment objectives. The user then enters information about regular investments into the interactive goal achievement system.

In all embodiments of the invention, users enter quantitative information about measurable goals and finite time periods over which the user expects to achieve these goals.

In FIG. 1A, after collecting goal-related data in process step 100, process step 102 computes the user's progress towards the goals entered by the user. In the embodiment of the present invention designed for salespeople, such computations include but are not limited to the number of days that all accounts have been open, the number of sales calls made to each open account, the average number of sales calls the user makes before successfully making a sale, which account might be most likely to make a purchase on the salesperson's next sales call to that account and any other metrics the user might find useful in achieving said sales goals. An important characteristic of all embodiments of the present invention is that the user need not keep records of any metrics. The interactive goal-achievement system performs all of the bookkeeping, allowing the user to focus on activities that lead to achieving the goals.

In the embodiment of the present invention designed for a dieter, process step 102 computes metrics such as the amount of weight lost during the current year, the amount of weight lost during the current month, the amount of weight lost during the current week and how much weight the user needs to lose to achieve monthly and yearly goals.

In the embodiment of the present invention designed for an investor, calculations made during process step 102 include calculating the amount of money invested during this year, calculating the amount of money invested during this month, calculating the interest and dividends accumulated during this year and during this month and calculating how much more investment is required from the user to reach the user's short-term and long-term investment goals.

Process step 104 asks the user for an estimate of the likelihood of reaching the next short-term, intermediate-term, and long-term goals and collects those estimates. Process step 104 is not necessary to help said user reach said goals and may therefore be omitted. However process step 104 is an extremely important step in enhancing the learning process and in the preferred embodiments of the present invention, process step 104 is included.

Initially, inexperienced users make poor estimates regarding their abilities to achieve goals. However, as users gain experience by successfully achieving short-term goals, they become more adept at estimating their chances of achieving these goals. Users receive aid in achieving their goals by using the interactive goal-achievement system and they learn to more accurately estimate their abilities to achieve those goals through interaction with the present invention. Over time, a user therefore becomes better able to set and achieve goals without the invention's aid. Thus learning occurs.

To aid in this learning process, process step 106 computes an estimate of the likelihood of said user's success in achieving goals. These likelihood computations are independent of the user's own estimate entered by the user in process step 104. Likelihood computations made in process step 106 are performed by analyzing the user's past performance and goal-achievement records.

In the embodiment of the present invention for salespeople, process step 106 calculates the average number of calls the user has made to previous accounts before making a sale, calculates an average per-sale dollar amount sold for all previous successful sales and calculates an average of the number of sales calls the user makes before abandoning an account as unlikely to produce a sale.

In the embodiment of the present invention designed for dieters, process step 106 computes an average of weekly, monthly and yearly weight loss.

In the embodiment of the present invention designed for investors, process step 106 computes the average weekly, monthly and yearly investment previously made by the user.

Process step 108 provides timely feedback on the user's progress towards achieving the user's goals directly to said user. Feedback takes the form of reports that incorporate the progress-towards-goal metrics computed in process step 106.

Process step 108 serves several purposes. First, process step 108 provides information to the user in a progress report documenting said user's progress towards achieving the user's short-term, intermediate-term and long-term goals. These progress reports and the progress-towards-goal metrics incorporated into these reports keep the user's mind focused on the immediate tasks necessary to achieve the user's goals.

In the embodiment of the present invention designed for a salesperson, process step 108 also recommends the best actions for the user to take next based on an estimate of the client accounts most likely to buy on a subsequent sales call. Learning to focus on the most important tasks at hand is an important key to learning how to regularly achieve goals.

Second, process step 108 provides the user with said user's own estimate of the likelihood of achieving said user's goals. Said estimate was collected in process step 104. Process step 108 also provides the user with the interactive goal-achievement system's estimate of the likelihood of achieving said user's goals. The interactive goal-achievement system's estimate was calculated in process step 106.

Third, the regular, timely feedback provided by process step 108 teaches the user to be realistic about setting achievable goals. Salespeople are often overly optimistic about their chances of making a sale. Dieters can optimistically decide to go off their diet for a week, thinking that they simply will lose two week's worth of weight the subsequent week. The present invention's record keeping and timely feedback tells users whether or not their expectations about reaching their goals are realistic based on the user's past performance.

Process step 110 provides reinforcement to the user which is an important psychological tool that aids learning. Process step 110 tells users through a printed, displayed or spoken report when they've made good and bad choices relative to their goals. Good decisions are rewarded in process step 110 with positive feedback and poor decisions are punished with negative feedback. Psychologically, reinforcement amplifies the effect of the timely feedback provided to said user in process step 108.

Process step 110 can provide reinforcement either on a scheduled regular periodic time period or using a random schedule. Regular periodic and random reinforcement are both effective learning aids but psychological studies performed by Skinner indicate that randomly administered reinforcement is more effective for learning than regular periodic reinforcement. Therefore random reinforcement is the preferred reinforcement method in the embodiments of the present invention, although either random or regularly scheduled reinforcement may also be used in various embodiments of the present invention.

Process step 110 may also be omitted. However omission of process step 110 will reduce the effectiveness of the interactive goal-achievement system and therefore, omitting process step 110 is not preferred.

Process step 112, the final process step, records the results of the user's progress-towards-goal metrics and any other information required to properly execute the process sequences shown in FIGS. 1A and 1B the next time the user makes use of the interactive goal-achievement system.

Figure 2:
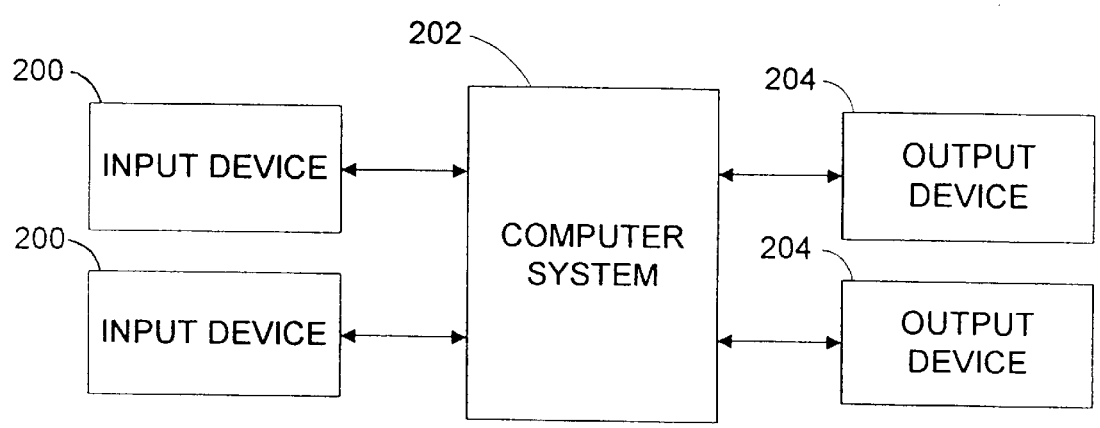
FIG. 2 shows a general block diagram of the preferred embodiment of an interactive goal-achievement system employed for implementing the method of the present invention.

The interactive goal-achievement system which is employed for carrying out the method of the present invention is preferably a computer-based system which, in its broadest sense, comprises three elements. As illustrated in FIG. 2, the first element comprises one or more input devices 200 for collection a user's input. Any embodiment of the present invention must have at least one of the input devices 200 and may have a plurality of such devices. The second element in the system is a computer system 202 for collecting user data from input devices 200, performing computations on said data and generating feedback reports for said user. The third element comprises one or more output devices 204 for providing feedback to the user.

An advantage of the system preferably employed with the method of the present invention is that it may incorporate more than one of the input devices 200 and more than one output device 204 to accommodate more than one mode of user input and output and so that the system can service more than one user simultaneously. In addition, the input devices 200 and the output devices 204 may be embodied by the same structure in some instances.

Significant additional advantages of the system shown in FIG. 2 are that the user alone supplies information to the computer system 202 through the input device 200 during data collection and the computer system 202 provides feedback to the user directly through the output device 204. Thus, the user interacts directly with the interactive goal-achievement system with no need for intervention by additional human operators. This aspect of the preferred embodiment of the present invention is an advantage for at least the following three reasons.

1) Direct interaction between the user and the system of the present invention is more efficient and allows the most timely provision of feedback reports to said user. Adding an intermediate operator increases the time required to perform the process sequences shown in FIGS. 1A and 1B.

2) Adding an intermediate human operator increases the likelihood of an error in data entry. Thus the lack of any such operator improves the accuracy of the interactive goal-achievement system.

3) Direct interaction between the user and the interactive goal-achievement system costs less than if an intermediate human operator were required to enter the user's data into the system or provide the user with feedback reports from the system.

The input device 200 is by necessity a bidirectional device because it must provide a means of conveying questions to the user from the computer system 202 during collection of goal-related data in process step 100. The input device 200 must provide a means of collecting the user's answers to said questions, and it must provide a means of conveying answers to said questions from the user back to the computer system 202. Preferably, the input device 200 is a tone-dial telephone because it is commonly found within most business and home premises and in a large number of public places.

Another advantage of the present invention is that ready access to the input device 200 increases the likelihood that a user will make use of the present invention regularly.

The output device 204 may be either a unidirectional or bidirectional device, and must be capable of transmitting detailed feedback information to the user either visually or aurally. Preferably, the output device 204 is a facsimile machine which is preferred when the input device 200 is a telephone because a facsimile machine produces written documentation of a user's progress. Written documentation of progress towards achieving goals ensures that the user is certain of the results to date. If users rely solely on their memory of the system's reports, faulty memory may guide the user's actions.

However, another advantage of the present invention is that the output device 204 need not be a facsimile machine or any other visual output device. Aural user feedback will be effective as well.

Figure 3A:
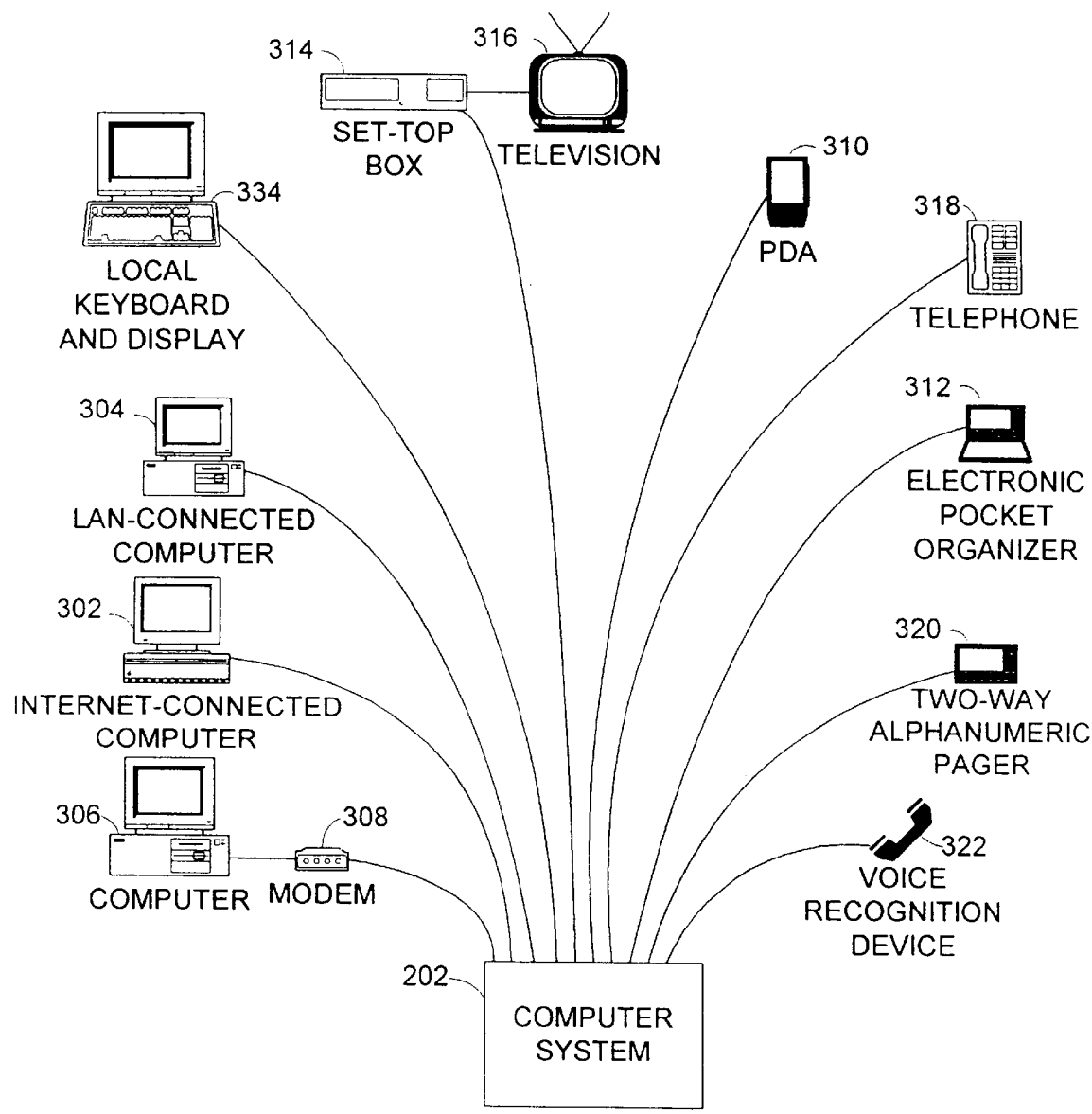
FIGS. 3A and 3B show various alternative device types capable of providing a means of input and a means of output for the interactive-goal achievement system of FIG. 2.
Figure 3B:
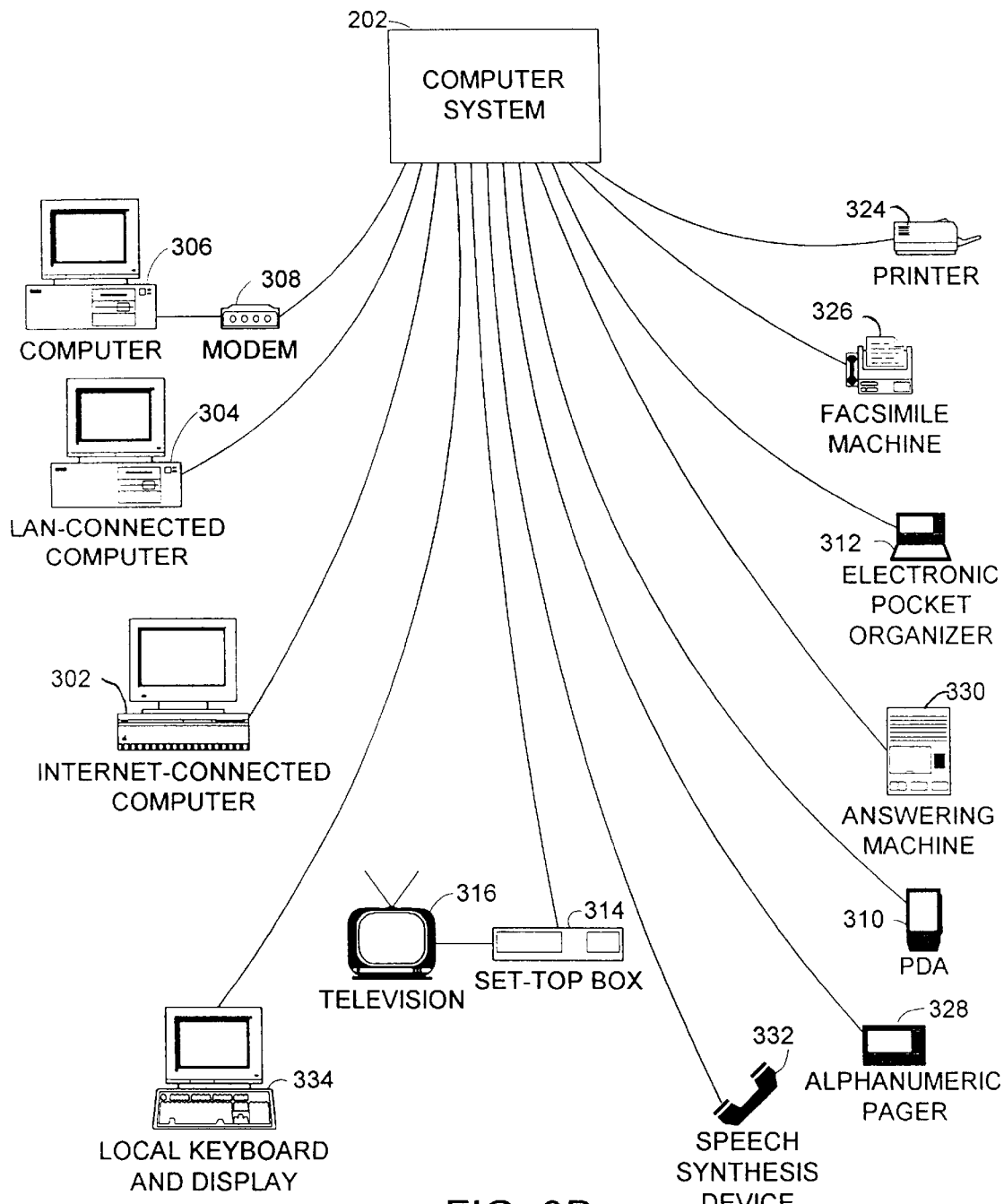

FIGS. 3A and 3B respectively show a plurality of the input devices 200 and the output devices 204 which are suitable as the means for supplying input to and output from the computer system 202. Suitable input devices appear in FIG. 3A and suitable output devices appear in FIG. 3B. The computer system 202 in the center of FIGS. 3A and 3B accepts and processes all of the inputs supplied by the input devices 200, performs all computations and generates all of the outputs to be conveyed by the output devices 204.

FIG. 3A shows suitable input devices 200 for the system of the present invention including but not limited to an Internet-connected computer 302, a LAN-connected computer 304, a remote computer 306 connected to a modem 308, a local keyboard and display 334, a set-top box 314 connected to a television 316, a PDA (programmable digital assistant) 310, a keypad or dial telephone 318, an electronic pocket organizer 312, a two-way alphanumeric pager 320 and a voice-recognition input device 322. Any input device is suitable for use in embodiments of the present invention if said device provides the user with interactive access to the computer system 202.

FIG. 3B shows the suitable output devices 204 for the system of the present invention including but not limited to the Internet-connected computer 302, the LAN-connected computer 304, the remote computer 306 connected to the modem 308, the local keyboard and display 334, a set-top box 314 connected to the television 316, a speech-synthesis device 332, an alphanumeric pager 328, the PDA 310, an answering machine 330, the electronic pocket organizer 312, a facsimile machine 326 and a printer 324. Any output device is suitable for use in embodiments of the present invention if it allows the computer system 202 to provide timely and detailed feedback to the user.

The suitability of an embodiment of the input device 200 or of the output device 204 depends on the application, the environment and the specific goals for which the invention is used. In an application where all users sit at desks in one building and all users have access to computers connected by a LAN, the LAN-connected computer 304 is likely to be the preferred embodiment of both the input device 200 and the output device 204. For applications that run directly on a user's computer, a local keyboard and display 334 is likely to be the preferred embodiment of both the input device 200 and the output device 204.

An advantage of the present invention is that the input device 200 and of the output device 204 may be the same physical device in some embodiments of the present invention, but need not be the same physical device in other embodiments.

FIGS. 4A to 4G show alternative embodiments for the computer system 202 ranging from small systems capable of handling one user or a few users to large networks of servers capable of handling many thousands of users.

Figure 4A:
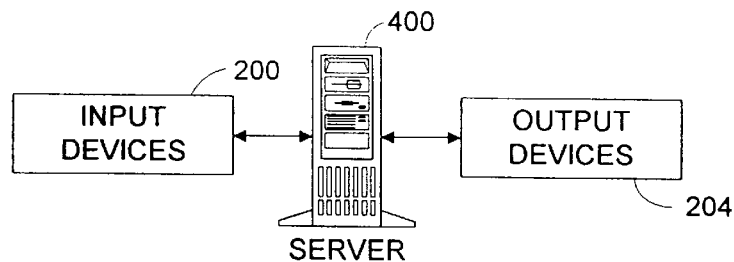
FIGS. 4A to 4G show various alternative computer system architectures capable of providing the means of data processing and data storage for the interactive goal-achievement system of FIG. 2.

FIG. 4A shows the simplest embodiment of the computer system 202 using one server 400 to perform all of the tasks performed by the computer system 202. All data collected from the one or more input devices 200 goes directly into the server 400. All feedback information generated by the server 400 passes from the server 400 to the one or more output devices 204.

Figure 4B:
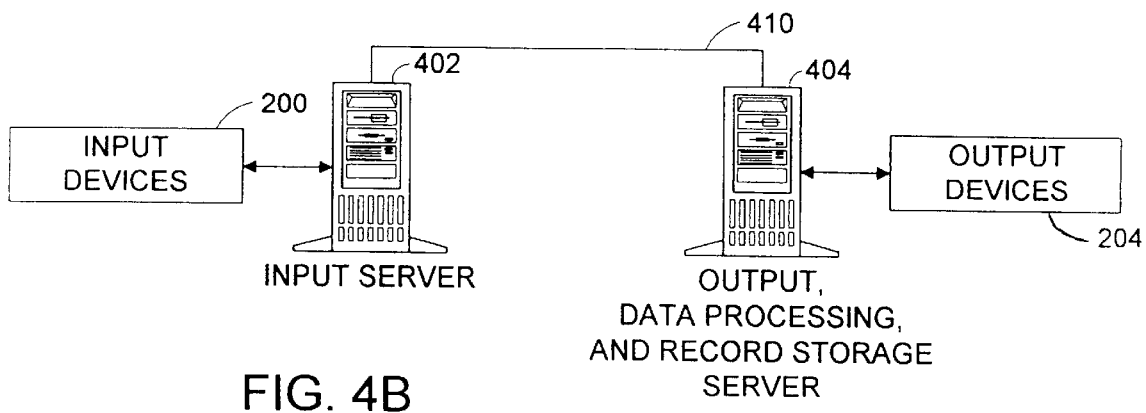

FIG. 4B shows an embodiment of the computer system 202 using an input server 402 to provide the means of collecting information from a user and an output, data processing and record storage server 404 for performing all required computation, for storing appropriate records of all user transactions, and for providing timely user feedback.

A local-area or a wide-area network 410 conveys information between the input server 402 and the output, data processing and record storage server 404. The embodiment of computer system 202 shown in FIG. 4B distributes the process steps shown in FIGS. 1A and 1B across the input server 402 and the output, data processing and record storage server 404 thus allowing the computer system 202 to accommodate more users simultaneously than the embodiment of computer system 202 shown in FIG. 4A.

Figure 4C:
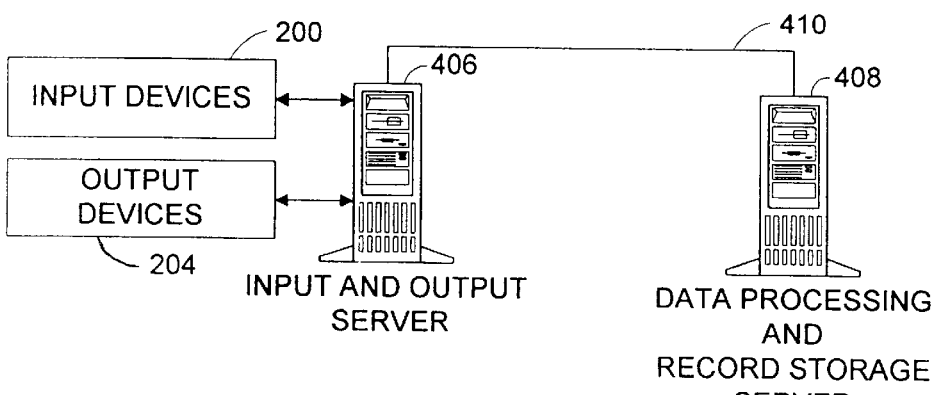

FIG. 4C shows an alternative embodiment of computer system 202 comprising two servers. The input and output server 406 provides both the means for collecting information from a user and a means for providing timely feedback to the user. A data processing and record storage server 408 provides a means for performing the required progress-towards-goal metrics computations and for storing appropriate records of all transactions.

The local-area or a wide-area network 410 provides a means for conveying information between the input and output server 406 and the data processing and record storage server 408. As with the embodiment of computer system 202 shown in FIG. 4B, the two-server embodiment shown in FIG. 4C can handle many more users simultaneously than the embodiment of computer system 202 shown in FIG. 4A.

Figure 4D:
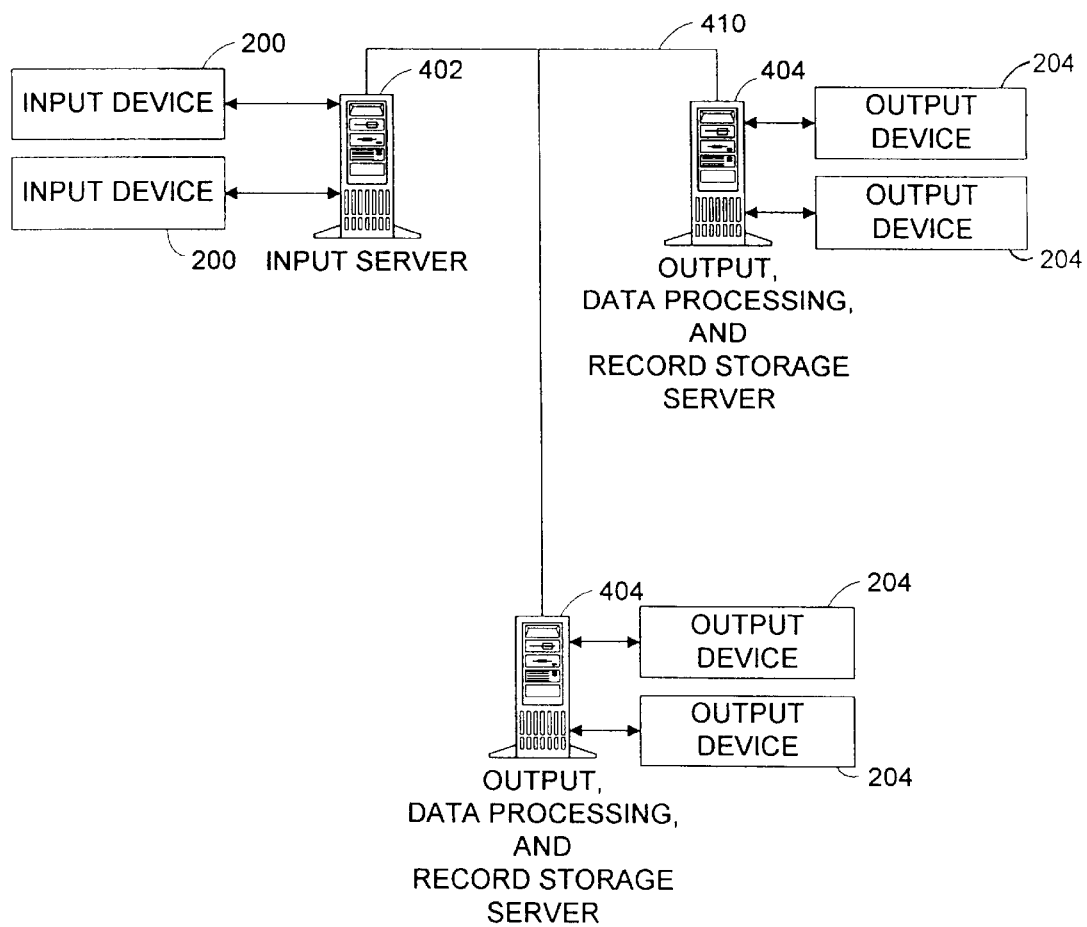

FIG. 4D shows an embodiment of computer system 202 consisting of the input server 402 and two of the output, data processing and record storage servers 404. The local-area or wide-area network 410 provides the means for conveying information between the input server 402 and the two output, data processing and record storage servers 404. This embodiment of computer system 202 is capable of handling more users simultaneously than embodiments shown in FIGS. 4A to 4C.

Figure 4E:
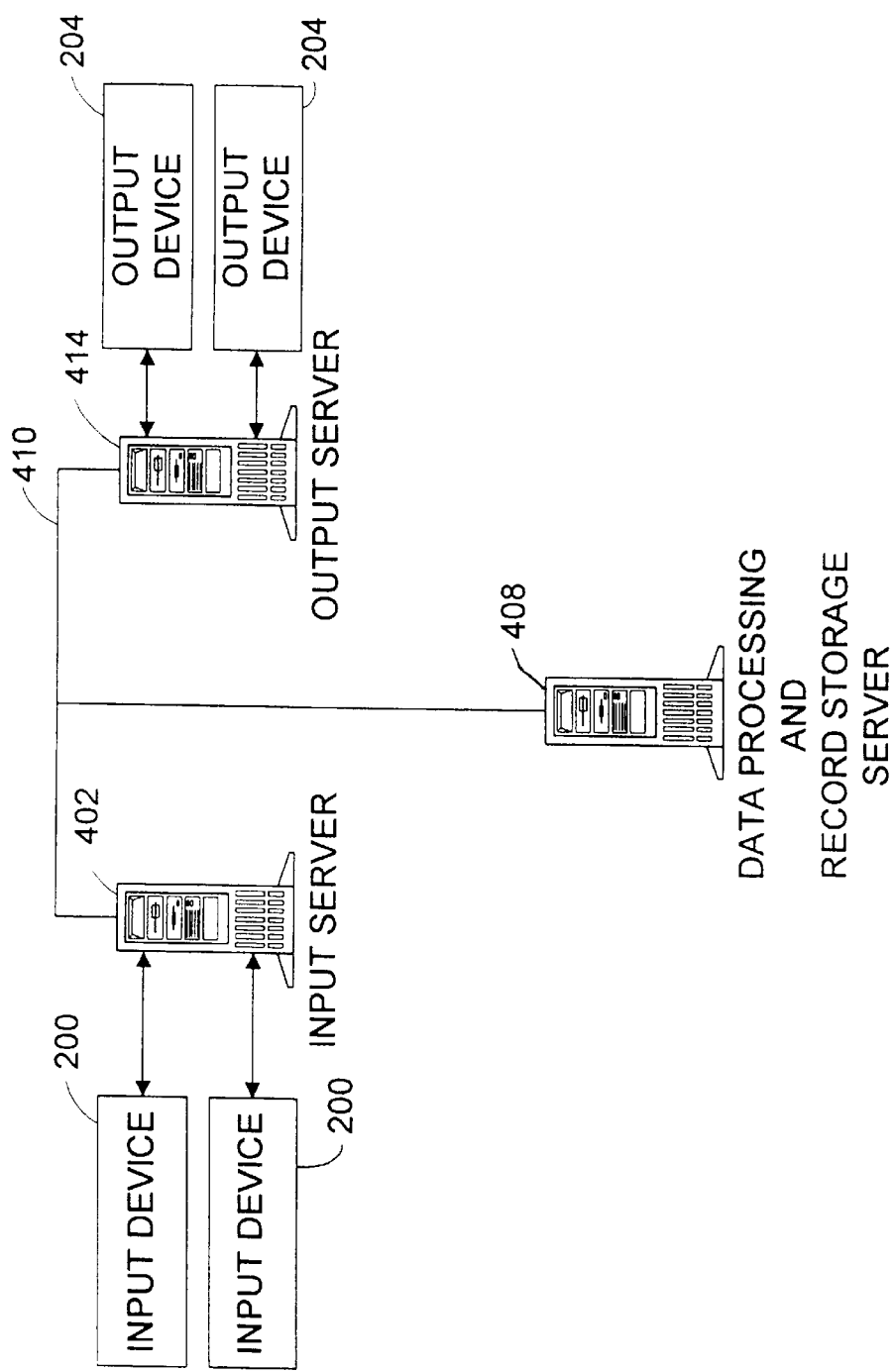

FIG. 4E shows an alternate embodiment of computer system 202 using three servers. The input server 402 accepts data from the one or more input devices 200. The data processing and record storage server 408 performs the required calculations and stores appropriate records of all transactions. Finally, an output server 414 provides timely feedback to the users through the one or more output devices 204.

The network 410 connects the input server 402, data processing and record storage server 408 and output server 414. The embodiment of computer system 202 shown in FIG. 4E is preferred over the embodiment shown in FIG. 4D if the computation of progress-towards-goal metrics in process step 102 is very complex, because complex calculations place additional loading on the server performing said computations.

Figure 4F:
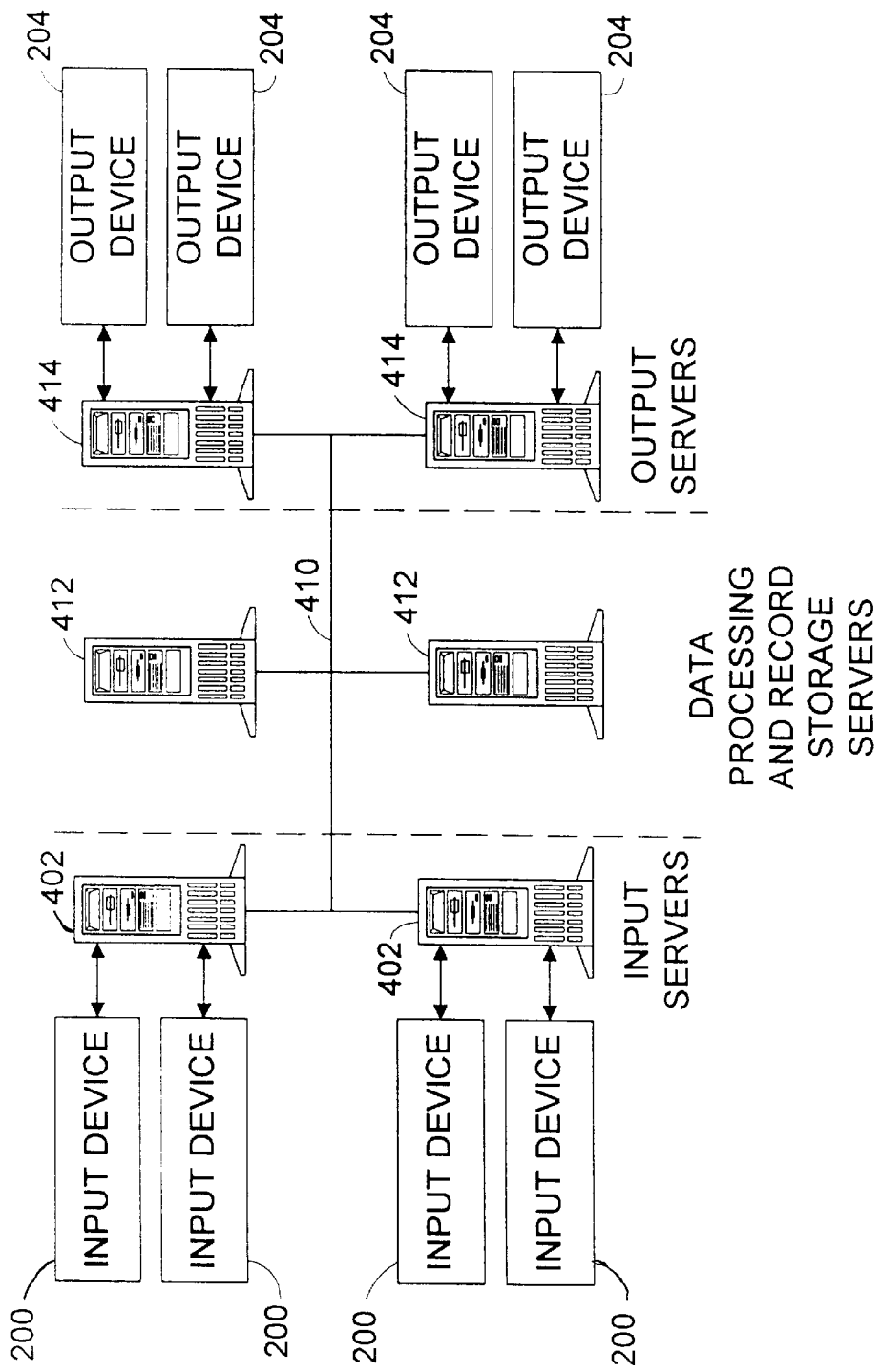

FIG. 4F shows an embodiment of computer system 202 for very large systems. A plurality of the input servers 402 collects information from a plurality of the input devices 200. A plurality of the data processing and record storage servers 408 performs the required calculations and stores appropriate records of all transactions. A plurality of the output servers 414 provides timely feedback to said users through a plurality of the output devices 204. The network 410 links all of the input servers 402, all of the data processing and record storage servers 408, and all of the output servers 414. The embodiment of the computer system 202 shown in FIG. 4F is the preferred embodiment for systems that must accommodate very large numbers of users simultaneously.

Figure 4G:
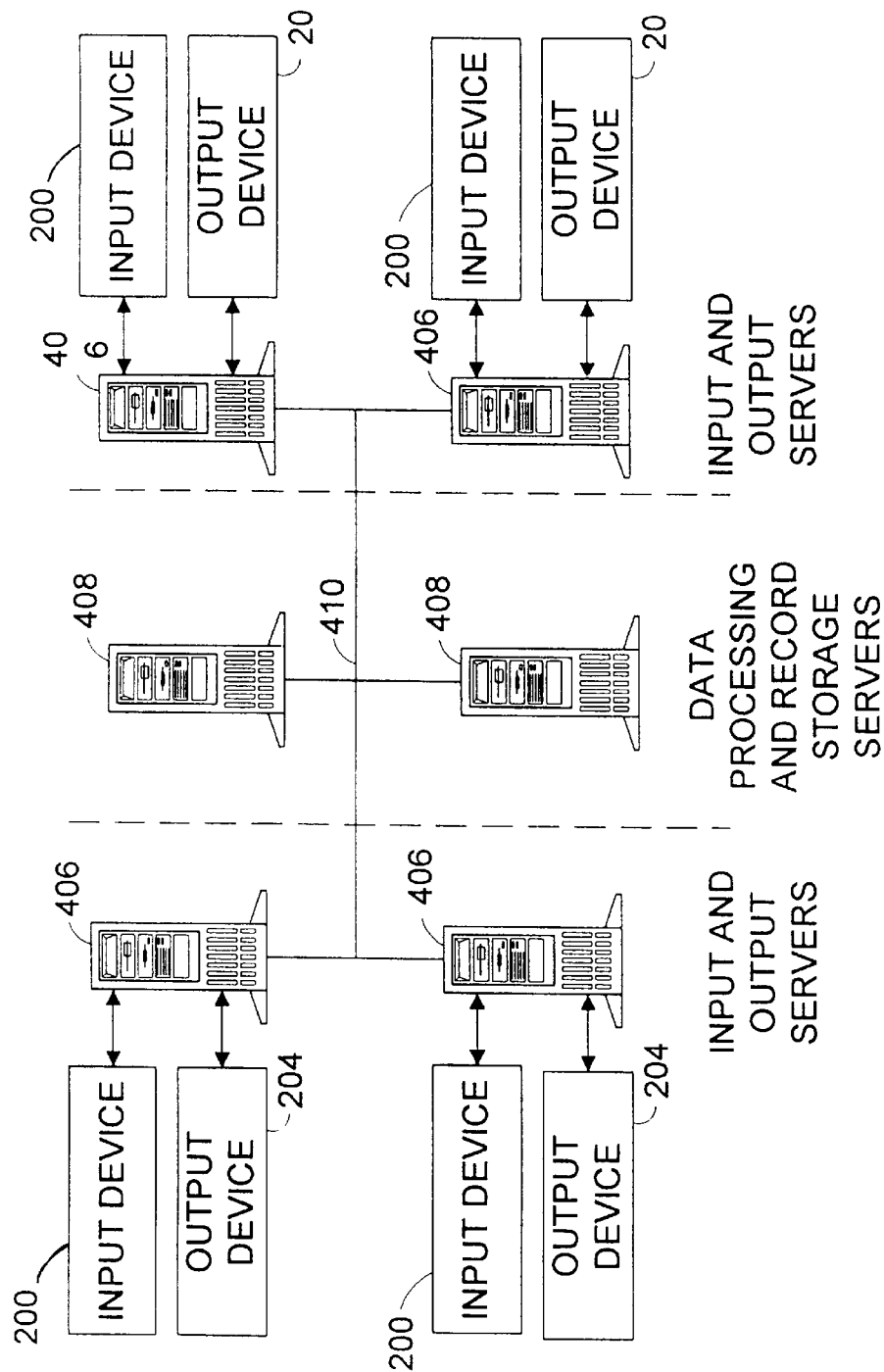

FIG. 4G shows an alternative embodiment of the computer system 202 for very large systems. A plurality of the input and output servers 406 collects information from a plurality of the input devices 200 and provides timely feedback to users through a plurality of the output devices 204. A plurality of the data processing and record storage servers 408 performs the required calculations and stores appropriate records of all transactions. A plurality of the output servers 414 provides timely feedback to the system users through a plurality of the output devices 204. The network 410 links all of the input and output servers 406 and all of the data processing and record storage servers 408 in this embodiment of the computer system 202. This embodiment of the computer system 202 is capable of handling very large numbers of users simultaneously.

Although the embodiments of the computer system 202 shown in FIGS. 4F and 4G are similar, one embodiment or the other may work better in any given application. The embodiment shown in FIG. 4F is preferred for applications where the input device 200 and the output device 204 are physically separate and distinct devices. The embodiment shown in FIG. 4G is preferred for applications where the input device 200 and the output device 204 are the same physical device.

It should be noted that the operation of the various embodiments of the present invention does not rely on a particular embodiment of the computer system 202. As FIGS. 4A to 4G show, many such embodiments of the computer system 202 are suitable for various embodiments of the interactive goal-achievement system.

The procedures shown in FIGS. 1A and 1B illustrate the general process-step flow of the preferred embodiments of the present invention. The flowcharts in FIGS. 5A to 5H provide a detailed illustration of the process-step flow of the embodiment of the present invention designed to help salespeople achieve short-term and long-term sales goals. Referring once again to FIG. 2, this embodiment of the present invention employs any touch-tone telephone as the input device 200 and any fax machine as the output device 204. The computer system 202 is preferably implemented using three personal computers arranged as shown in FIG. 4D, which may be IBM-compatible computers, for example.

The input server 402 in this embodiment of the present invention runs a program, which may be written in Microsoft Visual Basic and in Stylus Innovation's Visual Voice, to gather information from the user through a voice-processing interface card, such as one made by Pika.

The two output, data processing and record storage servers 404 generate and fax reports using software written for example in Microsoft Visual Basic, word-processing macros written for example in Lotus Ami Pro's macro programming language, and facsimile software such as Delrina's WinFax Pro facsimile software. Reports are faxed to the user through fax-modem interface cards. The three computers in this embodiment are linked by a parallel-printer-port networking device, such as a Net 44 from Leunig Communications Inc.

It should be noted that there is nothing special about how the software programs necessary for implementing the method of the invention should be written, and that it would be obvious to one of ordinary skill in the art having access to this description how to write these programs.

Before using this embodiment of the invention, a user registers for service, is entered into the user database by the system operator and receives an identification number. Registration includes information about the user's annual sales goal. After registering, the user calls into the system periodically using a touch-tone telephone. The incoming calls initiate the sequence shown starting in FIG. 5A.

Figure 5A:
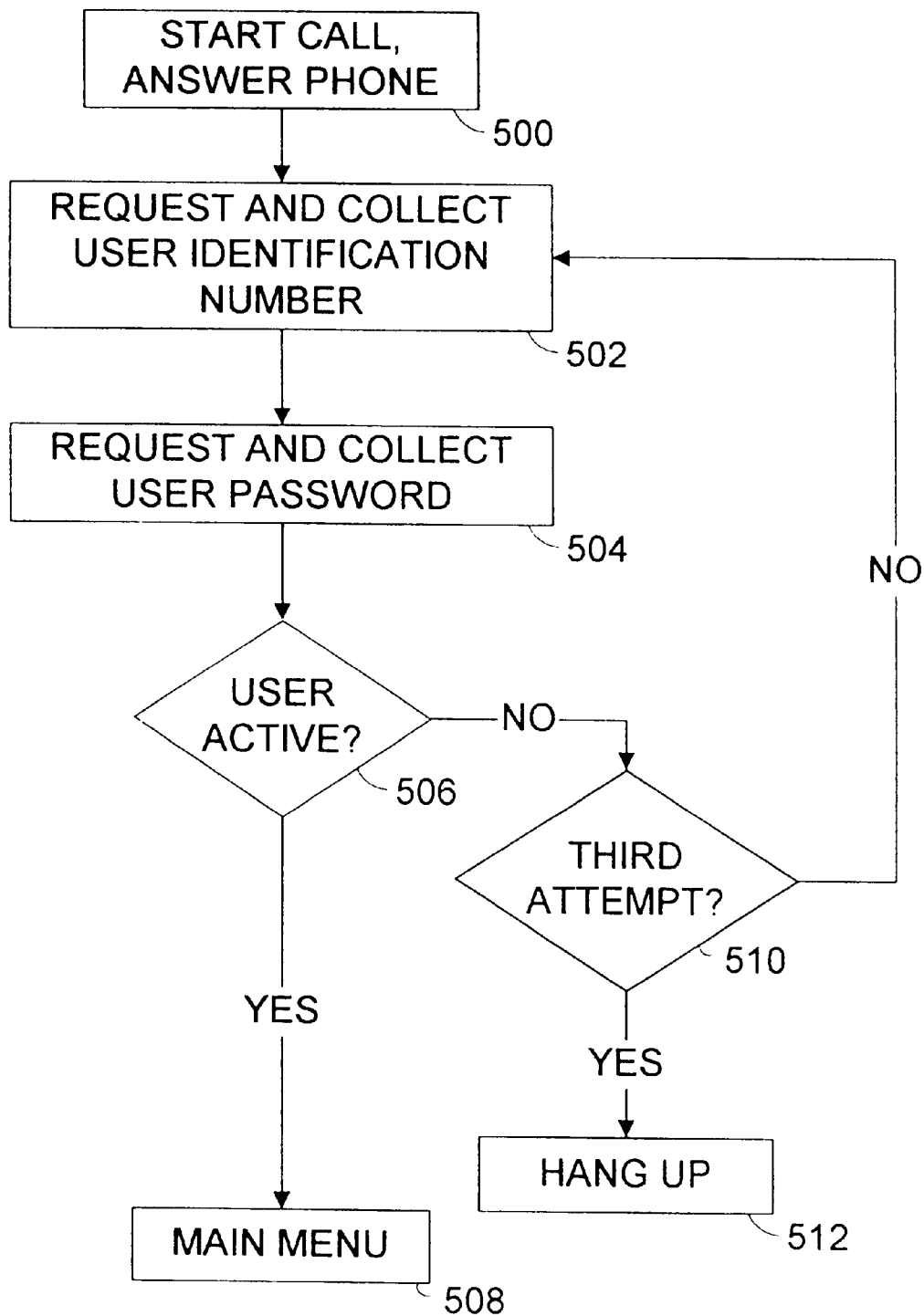
FIGS. 5A to 5H show detailed flowcharts for the operation of a specific embodiment of the interactive goal-achievement method of the present invention.

In FIG. 5A, the input server 402 starts the call procedure at step 500 by answering the telephone. Said server requests the user's identification number at step 502 using a prerecorded message. The user enters the requested identification number followed by the "#" symbol on the touch-tone telephone keypad. The input server 402 then requests the user's password at step 504. The user enters the requested password followed by the "#" symbol on the touch-tone telephone keypad.

The input server 402 uses the identification number and password information gathered in steps 502 and 504 to verify at step 506 that the incoming telephone call is from a valid, active user of the system. If the user number and password collected in steps 502 and 504 are valid, the procedure moves on to the main menu at step 508, and proceeds to the steps illustrated in FIG. 5B. If the user number or password collected in steps 502 and 504 are not valid, the procedure gives the user two additional attempts to enter valid identification at step 510. If after three attempts, the user has not entered a valid identification number and password, the system hangs up at step 512.

Figure 5B:
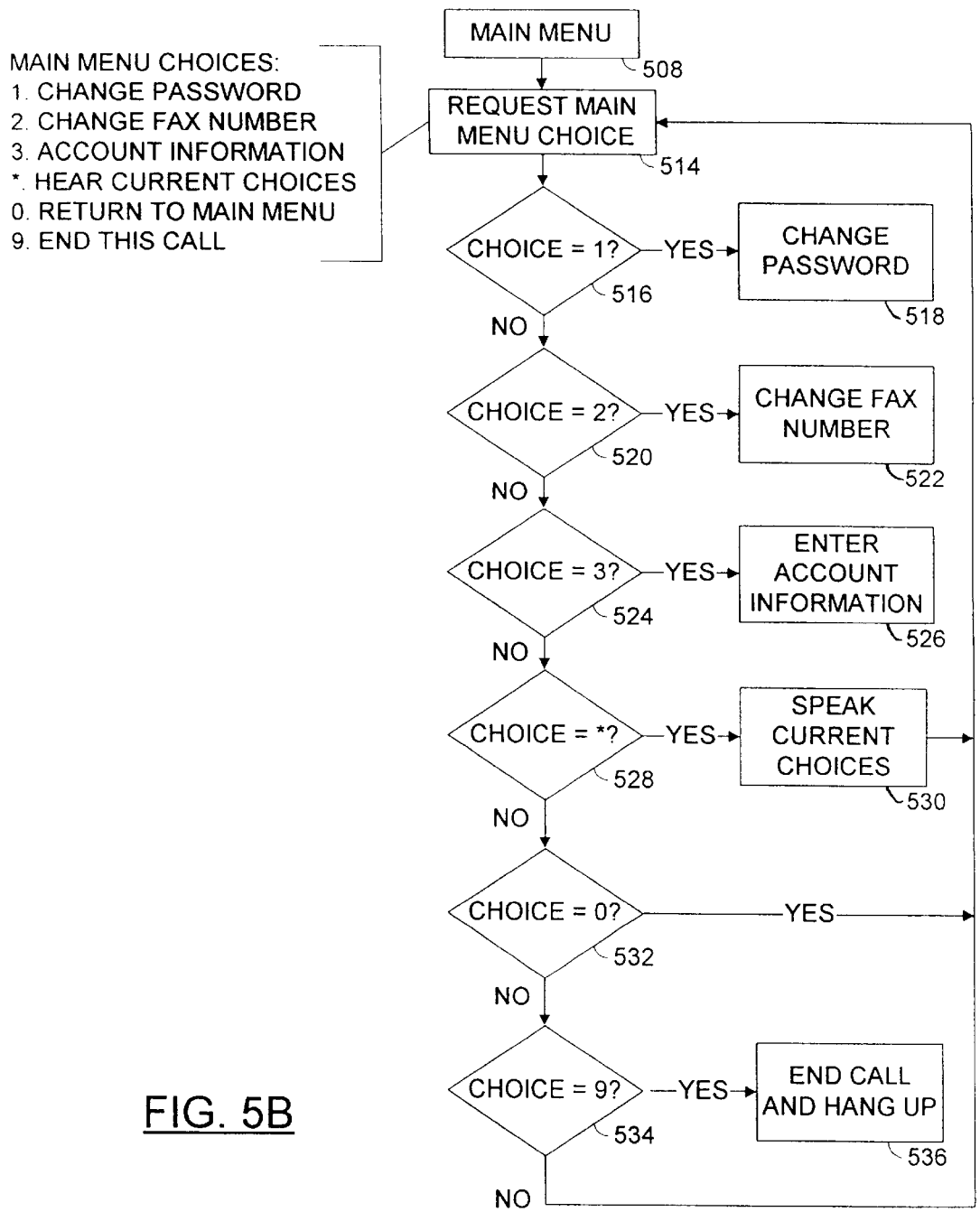

FIG. 5B shows the procedure's main menu loop. The input server 402 asks the user to select a menu choice at step 514. As illustrated, the choices allow the user to change the password, change the telephone number to which reports are faxed, enter account information, hear a list of the available choices, return to the main menu or end the call.

Figure 5C:
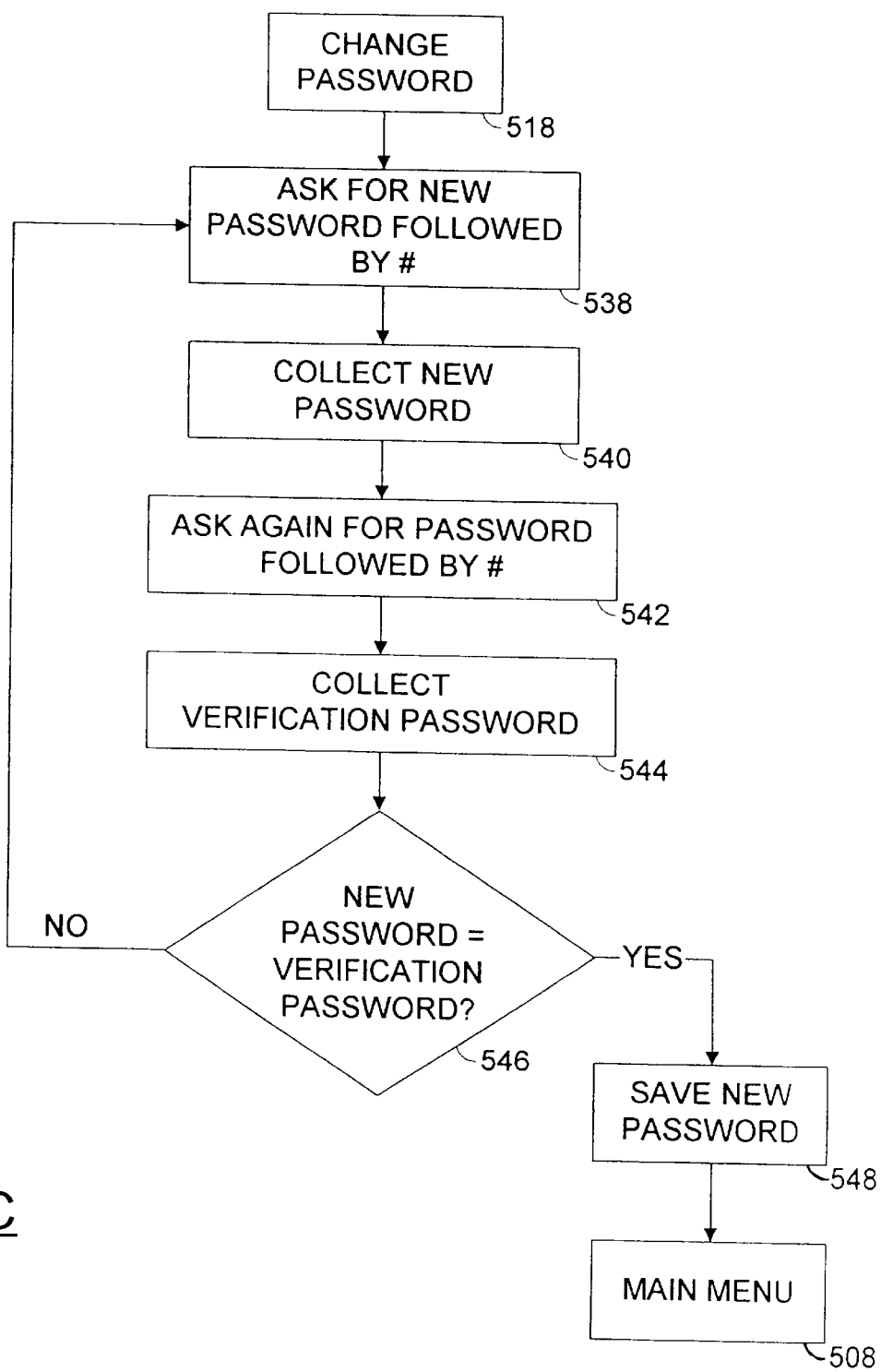

If the user presses a "1" on the touch-tone telephone keypad at step 516, the program branches to the "change password" routine at step 518, and proceeds to the steps illustrated in FIG. 5C.

Figure 5D:
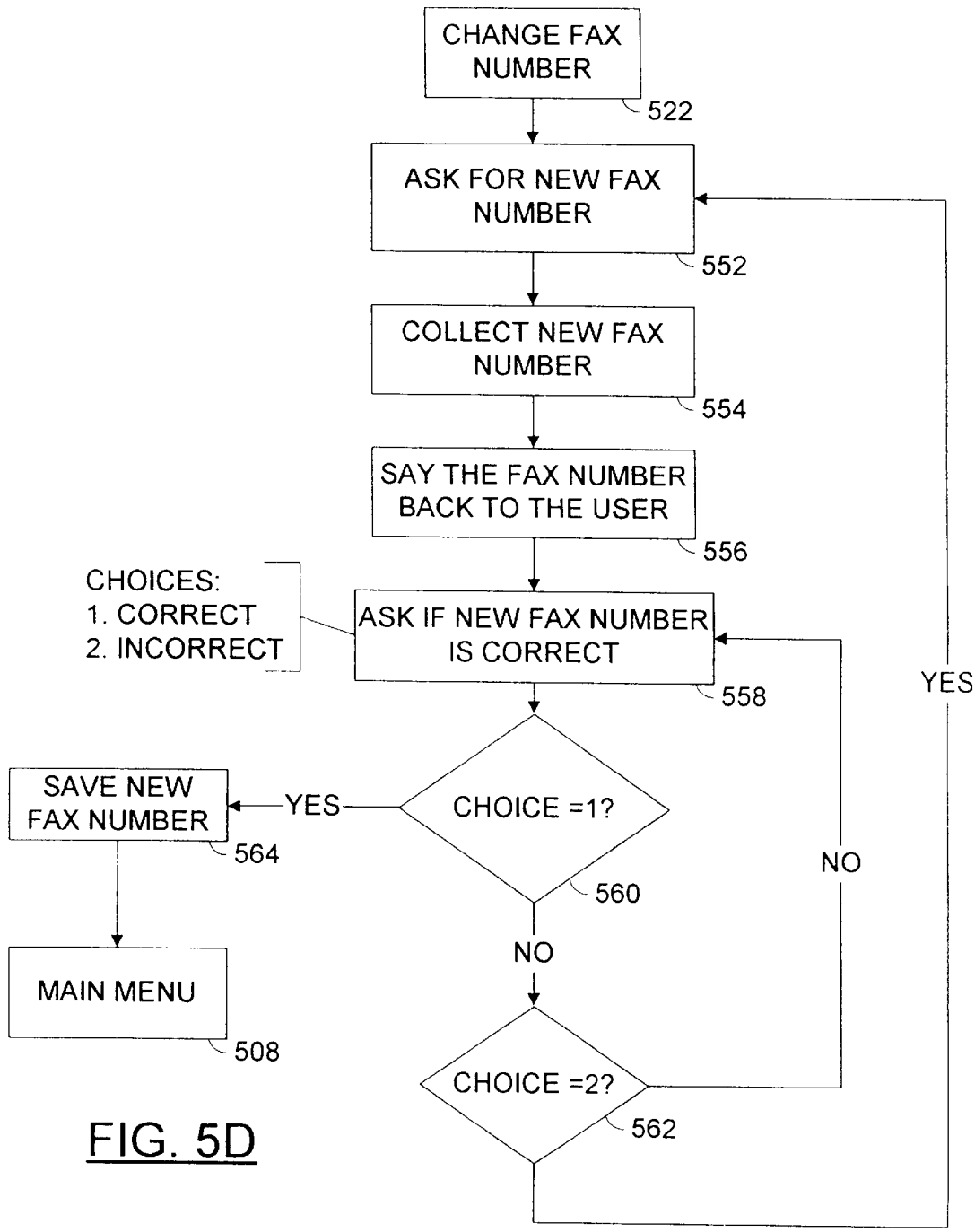

If the user presses a "2" on the touch-tone telephone keypad at step 520, the program branches to the "change fax number" routine at step 522, and proceeds to the steps illustrated in FIG. 5D.

Figure 5E:
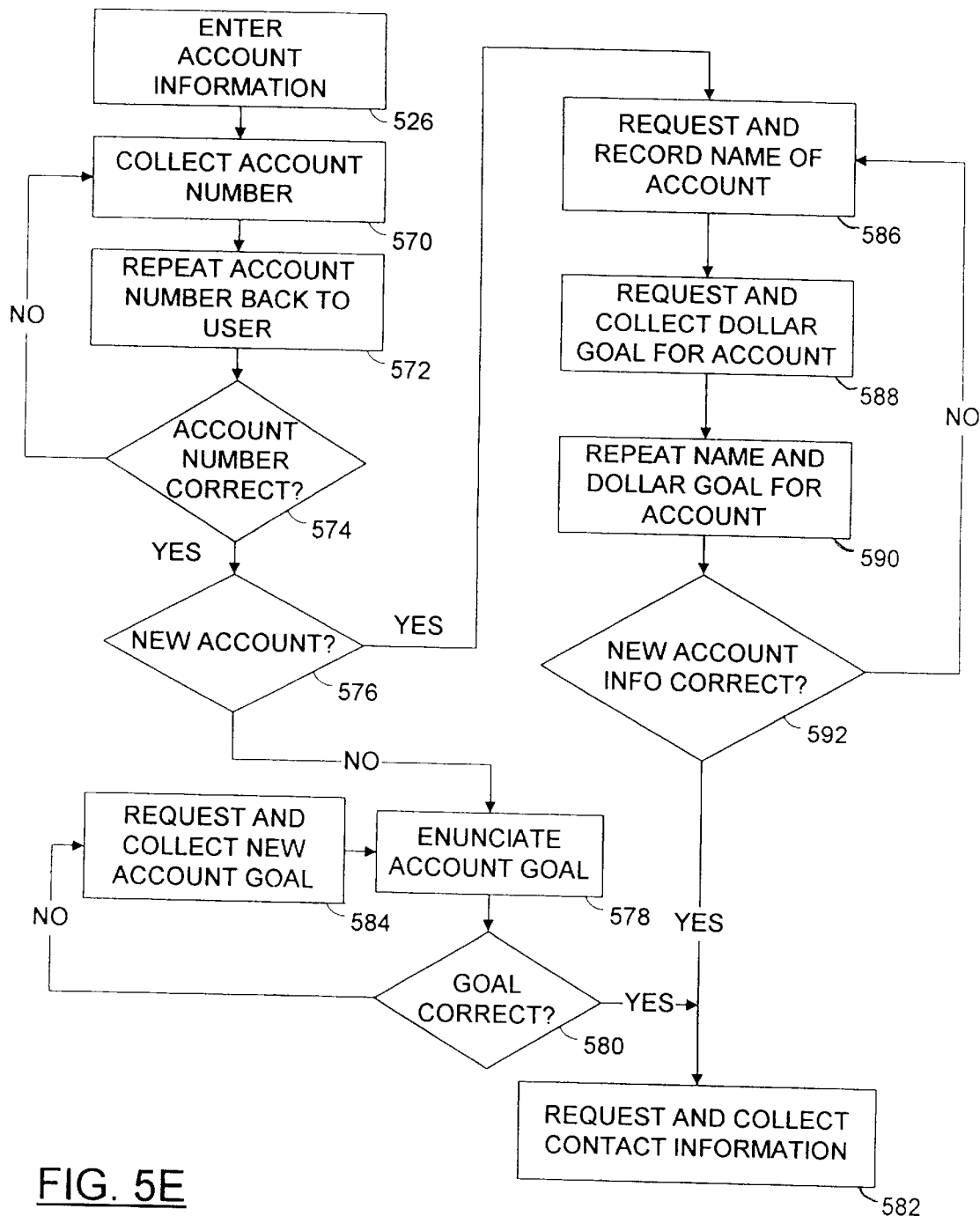
Figure 5F:
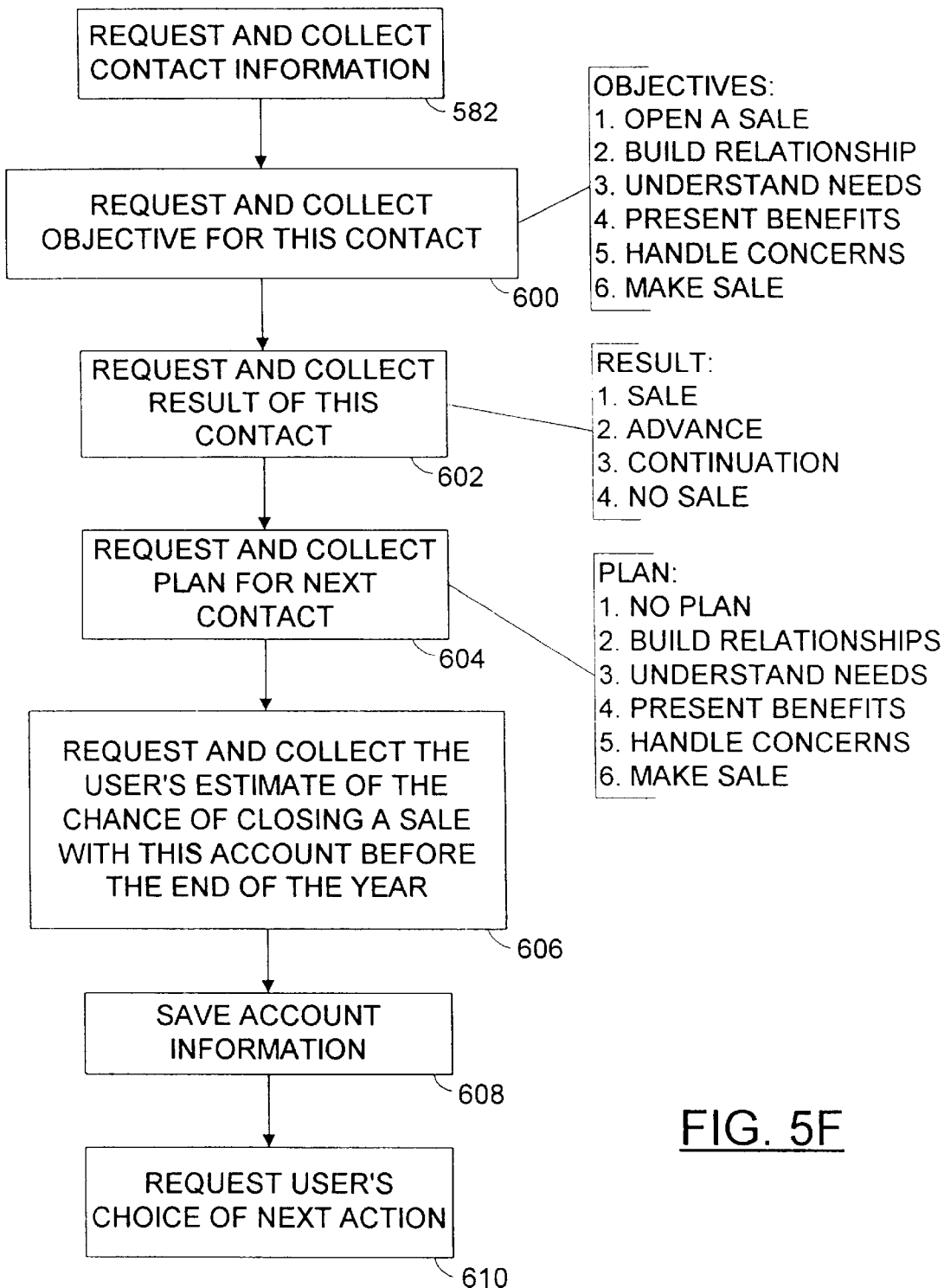
Figure 5G:
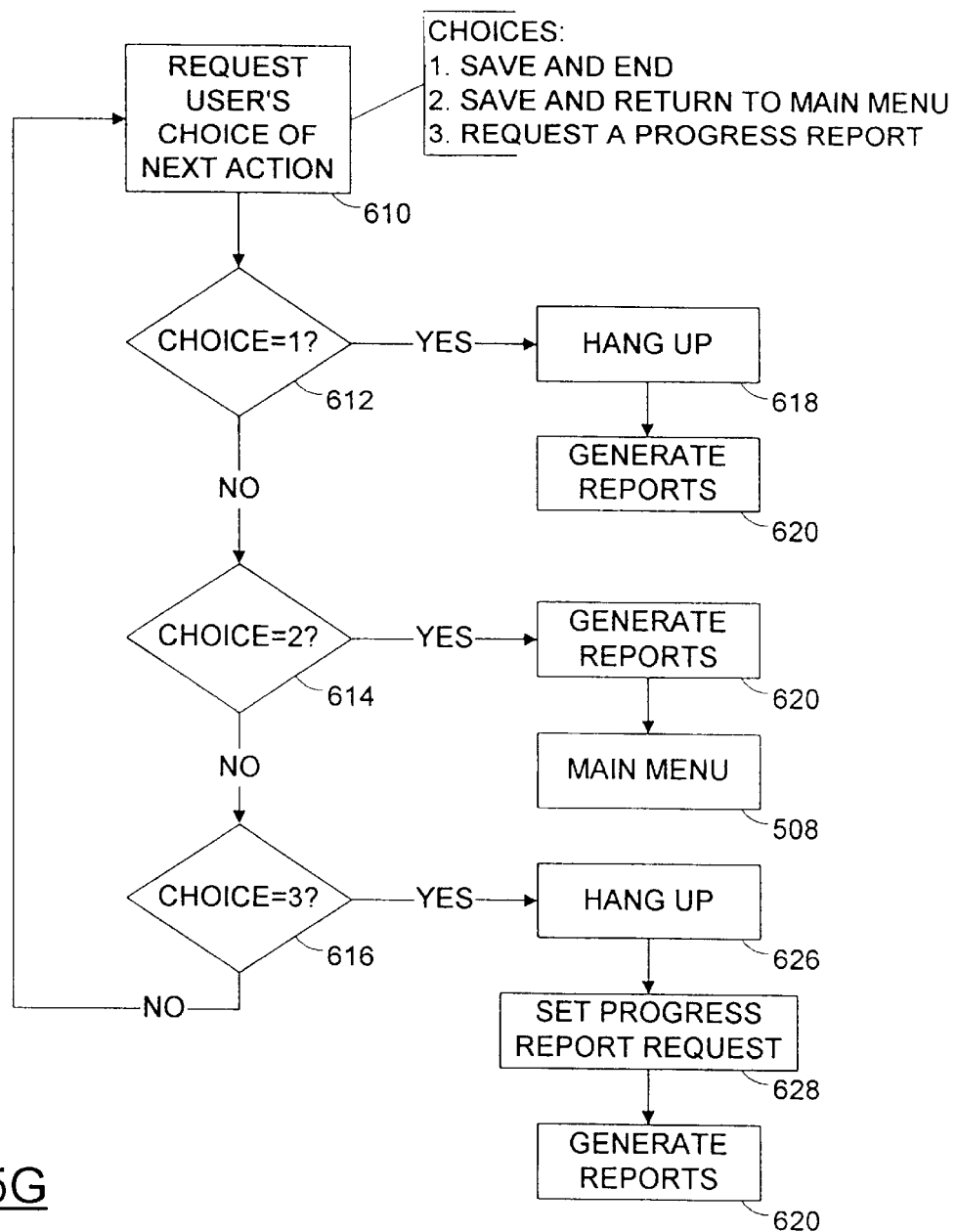

If the user presses a "3" on the touch-tone telephone keypad at step 524, the program branches to the "enter account information" routine at step 526, and proceeds to the steps illustrated in FIGS. 5E, 5F and 5G.

If the user presses a "*" on the touch-tone telephone keypad at step 528, the program repeats the main menu choices from a prerecorded message at step 530 and branches back to the main menu choice step 514.

If the user presses a "0" on the touch-tone telephone keypad at step 532, the program branches back to the main menu choice step 514.

Finally, if the user presses a "9" on the touch-tone telephone keypad at step 534, the program repeats a prerecorded farewell message and terminates the call at step 536.

FIG. 5C shows the "change password" routine initiated at step 518 that allows a user to change the password associated with said user's identification number. The input server 402 plays a prerecorded message requesting that the user enter a new password followed by the "#" symbol at step 538. The input server 402 captures the digits as the user enters them from the touch-tone telephone at step 540. The program terminates the password capture sequence when the user presses the "#" key.

The input server 402 then plays another prerecorded message asking once more for the new password at step 542 and collects the second entry of the password at step 544. If the two passwords entered by the user match each other at step 546, input server 402 saves the new password at step 548 and returns to the main menu loop step 508. If the two passwords do not match, the program branches back to step 538 at the beginning of the "change password" routine.

FIG. 5D shows the "change fax number" routine indicated at step 522 that allows a user to change the telephone number that the system calls to send account and progress reports by facsimile transmission. The input server 402 plays a prerecorded message at step 552 requesting that the user enter a new telephone number starting with a "1", followed by a three-digit area code and a seven-digit telephone number. The user enters the number using the touch-tone telephone keypad which is collected at step 554 by input server 402.

The input server 402 then repeats the number back to the user at step 556 employing speech synthesis to translate the numbers into spoken words. The input server 402 then plays a prerecorded message at step 558 asking if the collected telephone number is correct and instructing the user to press the "1" button on the touch-tone telephone keypad if the number is correct and the "2" button if the number is not correct. If the user presses the "1" button at step 560, the input server 402 saves the new telephone number at step 564 and returns to the main menu loop step 508. If the user presses the "2" button at step 562, the routine branches back to its beginning and requests the new fax telephone number at step 552. If the user presses any other button, the user's response to the question is unclear and the routine again asks if the new fax number is correct at step 558.

FIGS. 5E, 5F and 5G show the "enter account information" routine initiated at step 526. The input server 402 collects the account number by playing a prerecorded message asking the user to enter the account number followed by the "#" symbol at step 570. The user enters the account number on the touch-tone telephone keypad using the touch-tone telephone's "#" button as the terminating input character.

The input server 402 repeats the number back to the user employing speech synthesis to convert the account number into spoken words at step 572. The input server 402 then plays a prerecorded message asking the user if the account number is correct at step 574. The message asks the user to press the "1" button if the number is correct and the "2" button if the account number is incorrect. If the user presses the "2" button, the routine branches back to collect the account number again at step 570. If the user presses the "1" button, the input server 402 compares the account number entered by the user to a list of active account numbers for said user at step 576.

If the user enters an account number that already exists in the list of active accounts, the input server 402 enunciates the goal for this account at step 578 using speech synthesis and then asks the user to press the "1" button if the goal is correct or the "2" button if the goal is not correct at step 580. If the goal is not correct, the input server 402 plays a prerecorded message asking the user to enter the new goal followed by the "#" symbol and then collects the new goal at step 584. The input server 402 then repeats the new goal at step 578 and again asks if it is correct at step 580. Eventually, the goal is correct and the program proceeds to request and collect information about the latest contact with this account at step 582.

If the account number entered by the user in step 572 is not on the user's list of active accounts, then the account number is for a new account and the system proceeds to request additional information on the new account. The input server 402 plays a prerecorded message asking the user to say the name of the account at step 586 and records the user's speech. The recording is converted to a data file and is saved with the new account number.

The input server 402 then plays another prerecorded message asking the user to enter the dollar goal for this account, followed by the "#" symbol at step 588. The user enters this amount and the input server 402 saves this information along with the new account number and the user's voice recording associated with the account number. The input server 402 then says the account number using speech synthesis, plays back the user's voice recording, and speaks the account goal using speech synthesis at step 590. The input server 402 then asks the user if this information is correct at step 592. If the information is correct, the program then proceeds to collect information about the latest contact with this account at step 582. If the information is not correct, the program branches back to step 586 and again requests and records the name of the new account.

FIG. 5F shows the sequence of events which collect information on the latest contact with the selected account 582. The input server 402 plays a prerecorded message asking the user to press one button on the touch-tone telephone designating the objective for the latest contact at step 600. The choices are:

1. Open a sale
2. Build the relationship
3. Understand the client's needs
4. Present the benefits of the user's products or services
5. Handle client concerns
6. Make a sale The user presses the appropriate button and the input server 402 saves this information.

The input server 402 then plays a prerecorded message asking the user to press one button on the touch-tone telephone keypad designating the result of this contact at step 602. The choices are:

1. Made the sale
2. Got an advance
3. Got a continuation
4. No sale

The user presses the appropriate button and the input server 402 saves this information.

The input server 402 then plays a prerecorded message asking the user to press one button on the touch-tone telephone keypad designating the user's plan for the next contact with this account at step 604. The choices are:

1. No plan
2. Build the relationship
3. Understand the client's needs
4. Present the benefits of the user's products or services
5. Handle client concerns
6. Make a sale The input server 402 then plays a prerecorded message asking the user for an estimated probability of closing a sale with this account before the end of the year at step 606. The user enters the probability as a percentage terminated by the "#" symbol.

The input server 402 records all of the information gathered in steps 600, 602, 604 and 606 along with the other information saved for this account number. The input server 402 then asks the user to enter a choice for the next task to be performed during this phone call at step 610.

FIG. 5G shows the choices available after the user has entered the account information. The input server 402 plays a prerecorded message listing the choices and asking the user to press a button on the touch-tone telephone keypad corresponding to the appropriate action at step 610. The choices are:

1. Save the information entered and end this call
2. Save the information and return to the main menu
3. Request a progress report from the system If the user presses the "1" button at step 612, the input server 402 terminates the call by hanging up and sends a message to one of the output, data processing and record storage servers 404. This message contains all of the information entered by the user in the sequence of steps covered in FIGS. 5A through 5F. Receipt of this message causes the output, data processing and record storage server 404 to generate the appropriate account reports which it then faxes to the user at step 620 at the designated fax telephone number.

If the user presses the "2" button at step 614, the input server 402 sends a message to one of the output, data processing and record storage servers 404 initiating report generation at step 620 as detailed in the preceding paragraph above. The input server 402 then branches to the main menu step 508 to request additional information from the user. In this way, the user can enter information about several accounts or contacts during one phone call.

If the user presses the "3" button at step 616, the input server 402 terminates the call by hanging up and sends a message to one of the output, data processing and record storage servers 404. This message contains all of the information entered by the user in the sequence of steps covered in FIGS. 5A through 5F including a request for a progress report. Receipt of this message causes the output, data processing and record storage server 404 to generate the appropriate account and progress reports which it then faxes to the user at step 620 at the designated fax telephone number.

Figure 5H:
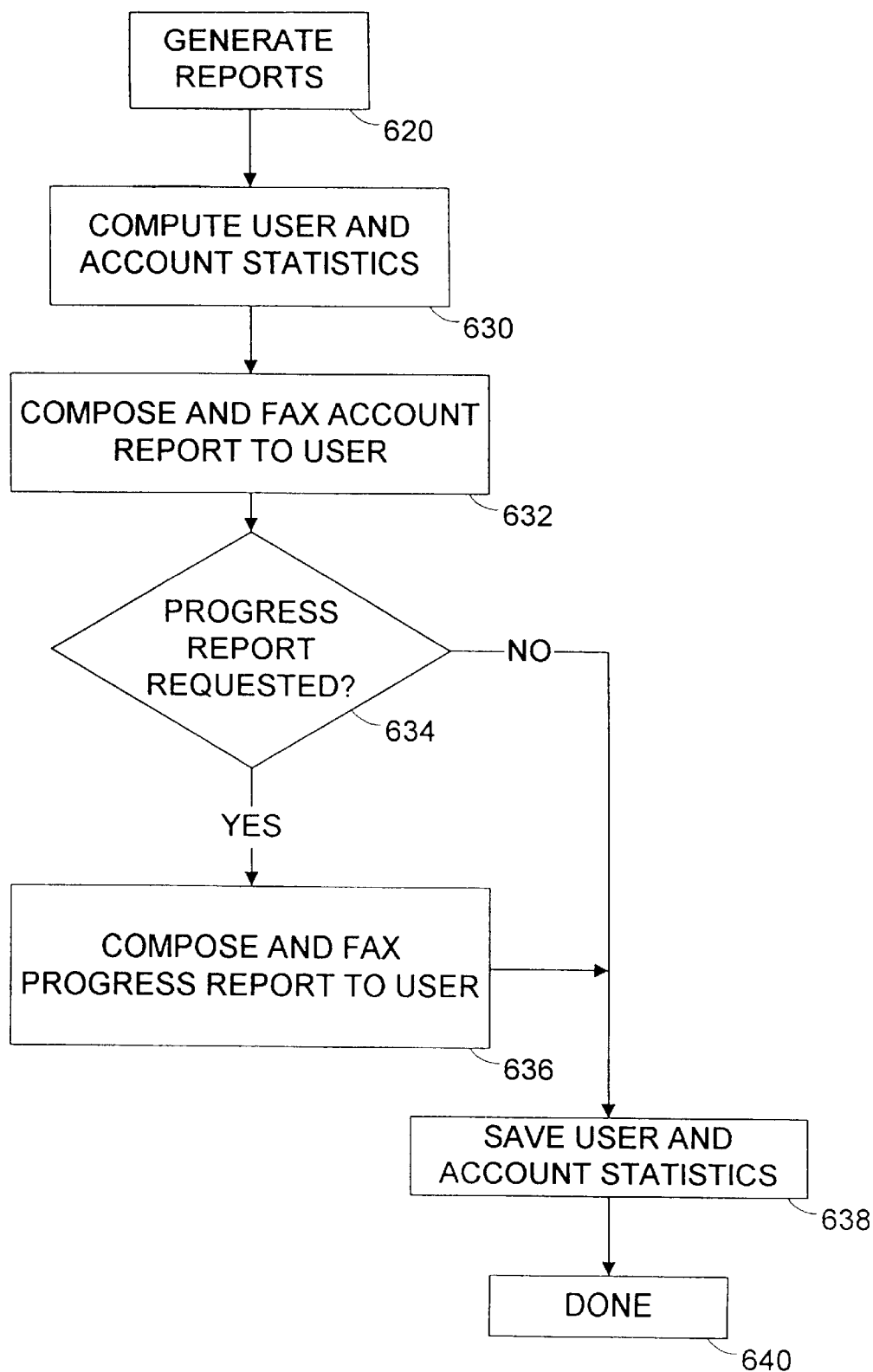

FIG. 5H shows the steps required to generate the reports requested by the user in FIGS. 5A through 5F. In this embodiment of the present invention, all of the steps in FIG. 5H occur on one of the two output, data processing and record storage servers 404 shown in FIG. 4D. Report generation is initiated by the sending of a report-generation message from the input server 402 to one of the two output, data processing and record storage servers 404. The input server 402 sends these report-generation messages, alternating between the two output, data processing and record storage servers 404. Thus the report-generation load is evened out by splitting the reports equally between the two output, data processing and record storage servers 404.

In this embodiment of the present invention, there are two output, data processing and record storage servers 404 and only one input server 402 because the generation and faxing of reports takes more time than the handling of incoming telephone calls from users. In other physical embodiments of the present invention, the situation may be different. An advantage of the present invention is that the computer system architectures presented in FIGS. 4A through 4G can accommodate a wide range of user population sizes and computer hardware.

The output, data processing and record storage server 404 receives the report-generation message from the input server 402 and computes user and account statistics at step 630 based on the information contained in the report-generation message and on the statistics about this user and account that were previously saved. Among the statistics computed are:

Calculations associated with an active account
1. Number of days account has been open;
2. Number of days since last contact with this account;
3. Largest number of days between contacts with this account;
4. Smallest number of days between contacts with this account;
5. Number of contacts with this account since it was opened;
6. Average number of accounts the user must open to make a sale;
7. Number of days between opening the account and making the sale;
8. Total sales to this account; and
9. Dollars per day yielded by this account.

Calculations made across accounts for this user
1. Total dollar sales made since the beginning of the year;
2. Number of days remaining until the end of the year;
3. Number of sales made across all accounts since the beginning of the year;
4. Mean number of days needed to make a sale across accounts;
5. Mean dollar sales across all active accounts;
6. Mean dollar goal across all active accounts;
7. Mean number of days between contacts across all accounts;
8. Mean number of days between contacts across sold accounts;
9. Mean number of contacts per account across all sold accounts;
10. Mean number of advances across sold accounts;
11. Mean number of continuations across no-sale accounts;
12. Mean number of contacts per account across all accounts; and
13. Mean dollar goal for accounts sold across all accounts.

Overall calculations
1. Forecast of dollar sales by the end of the year;
2. Forecast of likelihood of sale or no sale on this account; and
3. Ranking of this account based on likelihood and size of sale.

The above statistics give a detailed, quantitative picture of the user's ability to make sales calls, to move the sales process forward with accounts, and to make the sale. As a user enters information over a period of months, the statistical validity of the calculations increases.

The Account Report

The statistics computed in step 630 are used to compose the account report in step 632. The account report includes the following information:

1. The number of the account;
2. The user's name;
3. The report date;
4. The number of days the account has been open;
5. The objective for this contact;
6. The result of this contact;
7. The user's plan for the next contact;
8. The number of days since the last contact with this account;
9. The user's estimate of the likelihood of a sale with this account;
10. The system's estimate of the likelihood of a sale with this account;
11. The sales goal for this account in dollars; and
12. The result of this sale to date in dollars;

In addition to the above information, the report contains additional information on the user's past sales performance. The account report also lists:

1. What account goal creates the most sales for this user;
2. The user's average sale in dollars;
3. The average number of days the user takes to close a sale;
4. The average number of contacts the user requires to close a sale;
5. How this accounts shapes up in light of the information in items 1 to 4 above; and
6. A ranking of this account's priority among all open accounts.

All of the above report information provides quantitative feedback to the user on the user's sales performance. The system faithfully records each step in the sales process and each sale. Through the computations performed in step 630, the system constantly adjusts the average performance statistics for the user. This detailed feedback provides the user with a very detailed picture of performance. Because the report is faxed back to the user within minutes of the call from the user, the feedback is timely. This is the timely feedback shown in process step 108 in FIGS. 1A and 1B.

The account report ends with a summary of the account's status. If the account is well on its way to a sale, the report states that situation. If the account is not proceeding towards a sale in a normal fashion for this user, the report states that. This summary provides the psychological reinforcement of process step 110 shown in FIGS. 1A and 1B.

Once generated, the output, data processing and record storage server 404 faxes the report to the user at step 632 at the designated telephone number.

If the user did not request a progress report, the output, data processing and record storage server 404 records the results of the calculations made in step 630 to generate the account reports in the user's file and terminates this session 640.

The Progress Report

If the user requested a progress report at step 634, then the output, data processing and record storage server 404 generates a progress report at step 636. The progress report contains the following information:

1. The user's name;
2. The report date;
3. The monthly sales goal (one twelfth of the annual sales goal);
4. The progress made towards the monthly sales goal;
5. The annual sales goal;
6. The total year-to-date sales;
7. The sales needed to make the monthly sales target;
8. The sales needed to make the annual sales target;
9. The monthly sales made to date this year, expressed in dollars;
10. The monthly dollar sales required through the end of the year to achieve the target; and
11. The fraction of the annual sales goal already achieved.

The 11 statistics listed in the progress report provide the user with additional, timely feedback of sales performance as called for in process step 108 in FIGS. 1A and 1B.

Once the output, data processing and record storage server 404 generates the progress report, it faxes the report to the user at the designated phone number at step 636. The output, data processing and record storage server 404 then records the results of the calculations made to generate the reports in the user's file at step 638 and terminates this session at step 640.

Once the user receives the reports sent during the steps illustrated in FIG. 5G, the user may telephone a human mentor to discuss the details and other aspects of the reports, goals and progress made towards these goals. Discussion of these items can enhance the user's ability to use the information provided by the reports.

Although the present invention has been disclosed in terms of a number of preferred embodiments and variations thereon, it will be understood that the scope of the invention as defined in the following claims is not limited to these embodiments, and that numerous other modifications and variations could be made without departing from the scope of the invention. For example, although the preferred embodiments are specifically directed toward assisting individuals in achieving sales, weight loss or financial investment goals, the fundamental principals of the invention may easily be applied to any set of circumstances which involve goal achievement.

What is claimed is:

1. A computer implemented method for assisting an individual to set and achieve goals comprising the steps of:
    a) periodically collecting information about goals from an individual, including an individual's estimate of their likelihood of achieving said goals and progress towards said goals, by entering said information into an input device connected to a computer system;
    b) computing metrics with said computer system from said information, said metrics corresponding to said individual's progress towards reaching said goals; and
    c) providing feedback information to said individual regarding said individual's progress towards reaching said goals and said individual's estimate of their likelihood of achieving said goals, by communicating said feedback information from said computer system to an output device interfaced thereto.

2. The method of claim 1, further comprising the step of providing psychological reinforcement to said individual.

3. The method of claim 1, further comprising the steps of:
    d) computing additional metrics for the likelihood of said individual's success in achieving said goals based on said individual's past performance in achieving said goals; and
    e) providing feedback to said individual of said additional metrics.

4. A system for assisting an individual to set and achieve goals comprising:
    a) means for collecting information pertaining to a plurality of goals that are each defined by an individual using said system, said information including an individual's own estimate of their likelihood of achieving said goals;
    b) means for periodically collecting information about said individual's progress toward said goals from said individual;
    c) means for computing metrics corresponding to said individual's progress towards reaching said goals; and
    d) means for providing feedback information to said individual regarding said individual's progress towards reaching said goals.

5. The system of claim 4, wherein:
    said means for collecting comprises at least one input device;
    said means for computing comprises a computer system for receiving said information from said input device; and said means for providing feedback information comprises at least one output device for receiving said feedback information from said computer system.

6. The system of claim 5, wherein said at least one input device is selected from the group comprising a computer, a keyboard, a set-top box connected to a television, a programmable digital assistant, a telephone, an electronic pocket organizer, a pager and a voice-recognition input device.

7. The system of claim 5, wherein said at least one output device is selected from the group comprising a computer, a display, a set-top box connected to a television, a speech-synthesis device, a pager, a programmable digital assistant, an answering machine, an electronic pocket organizer, a facsimile machine and a printer.

8. The system of claim 5, wherein said computer system further comprises means for generating psychological reinforcement information, and communicating said psychological reinforcement information to said output device.

9. The system of claim 5, wherein said computer system further comprises means for computing additional metrics on the likelihood of said individual's success in achieving said goals based on said individual's past performance, and providing feedback to said individual of said metric's estimate of success to said output device.

10. The system of claim 5, wherein said input device comprises a touch tone telephone and said output device comprises a fax machine.

11. The system of claim 4, wherein said means for collecting further includes means for collecting an individual's estimate of their likelihood of achieving said goals.

12. The system of claim 4, wherein said means for collecting further includes means for collecting activities defined by said individual that said individual intends to employ to reach said goals.

* * * * *